US008305522B2

(12) United States Patent
Hashimotodani

(10) Patent No.: US 8,305,522 B2
(45) Date of Patent: Nov. 6, 2012

(54) PLASMA DISPLAY PANEL AND DISPLAY DEVICE

(75) Inventor: Kiyoshi Hashimotodani, Kyoto (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/505,266

(22) PCT Filed: Mar. 16, 2011

(86) PCT No.: PCT/JP2011/001564
§ 371 (c)(1),
(2), (4) Date: Apr. 30, 2012

(87) PCT Pub. No.: WO2011/151957
PCT Pub. Date: Dec. 8, 2011

(65) Prior Publication Data

US 2012/0212464 A1 Aug. 23, 2012

(30) Foreign Application Priority Data

Jun. 4, 2010 (JP) ................................ 2010-128508

(51) Int. Cl.
*G02F 1/1347* (2006.01)

(52) U.S. Cl. ................. 349/78; 349/56; 349/74; 349/77

(58) Field of Classification Search .................... 349/56, 349/74, 77, 78
See application file for complete search history.

(56) References Cited

U.S. PATENT DOCUMENTS

| | | | | |
|---|---|---|---|---|
| 2001/0015621 | A1 | 8/2001 | Oniki | |
| 2003/0085649 | A1 * | 5/2003 | Wachi et al. | 313/479 |
| 2003/0218579 | A1 | 11/2003 | Uemura et al. | |
| 2005/0052362 | A1 | 3/2005 | Uemura et al. | |
| 2006/0138959 | A1 * | 6/2006 | Tessier | 313/610 |
| 2006/0192732 | A1 | 8/2006 | Uemura et al. | |
| 2008/0218439 | A1 | 9/2008 | Uemura et al. | |

FOREIGN PATENT DOCUMENTS

| | | |
|---|---|---|
| JP | 09-244578 | 9/1997 |
| JP | 2001-265281 | 9/2001 |
| JP | 2002-083543 | 3/2002 |
| JP | 2003-346660 | 12/2003 |
| JP | 2007-249227 | 9/2007 |
| JP | 2007-294360 | 11/2007 |
| JP | 2009-277492 | 11/2009 |

* cited by examiner

*Primary Examiner* — Jennifer Doan

(57) ABSTRACT

With the objective of achieving increased luminous efficiency while suppressing a rise in discharge voltage in a high-definition PDP, a PDP is configured with ribs at intervals between a front plate and a back plate, the ribs partitioning a gap between the front plate and the back plate into spaces. Each space constitutes a discharge cell. A minimum width of a discharge space in the discharge cell is in a range from 65 μm to 100 μm at a position adjacent to a pair of discharge electrodes. A ternary discharge gas of xenon, neon, and helium is enclosed in the discharge space. The partial pressure ratio of xenon in the discharge gas is in a range of 15% to 25%, and the partial pressure ratio of helium is in a range of 20% to 50%. The total pressure of the discharge gas is set between 60 kPa and 70 kPa.

3 Claims, 17 Drawing Sheets

PLASMA DISPLAY PANEL AND DISPLAY DEVICE

TECHNICAL FIELD

The present invention relates to plasma display panels and to display devices that use plasma display panels, and in particular to high-definition plasma display panels.

BACKGROUND ART

In recent years, as large screen sizes have become common for home television receivers, flat-screen display devices have rapidly become popular as a replacement for conventional Cathode Ray Tube (CRT) devices. Along with liquid crystal displays, the main type of display device with a large, flat screen is a plasma display panel (hereinafter referred to as a PDP), which achieves luminescent display by causing plasma discharge to occur in minute cells corresponding to pixels and converting the emitted ultraviolet radiation into visible light via phosphors.

In a PDP, the most common method currently used to cause a plasma discharge in the cells is a method referred to as AC surface discharge.

In a typical structure for an AC surface discharge PDP, barrier walls referred to as ribs are provided between two glass substrates (a front substrate and a back substrate) to establish a gap of a fixed distance, so that a discharge space enclosed by the two glass substrates is formed in this gap. A discharge gas is injected into the discharge space, and rows of parallel electrode pairs are formed on the surface of the front substrate facing the discharge space, each electrode pair being formed by a scan electrode and a sustain electrode. Furthermore, an insulating layer is formed on the electrode pairs. Data electrodes are provided on the back substrate in a position perpendicular to the electrodes on the front substrate. The data electrodes are covered by an insulating layer.

In a PDP with this structure, applying voltage between the scan electrodes and the sustain electrodes creates a plasma discharge by causing the discharge gas in the discharge cells to undergo breakdown. At this point, since an insulating layer is formed on the scan electrodes and the sustain electrodes, the electric charge produced by the discharge accumulates on the surface of the insulating layer, offsetting the potential of the electrodes. As a result, when voltage is applied, a discharge occurs in the form of a pulse, and a wall charge accumulates. When the applied voltage reverses, however, the wall charge overlaps with the reversed applied voltage due to having the same polarity, and therefore the applied voltage necessary for sustaining discharge reduces. By controlling this wall charge, discharge in the discharge cell can selectively be turned on or off, thus allowing for image display.

Conventionally, PDPs emit ultraviolet light using xenon, which has a relatively high ionization and excitation voltage. Therefore, the power efficiency of conversion of input power into useful ultraviolet light is an extremely low value of 10% or less. Accordingly, efforts have been made to increase the luminous efficiency of PDPs. As described in Patent Literature 1 and 2, the composition of the discharge gas has been examined.

For example, Patent Literature 1 discloses increasing the partial pressure of xenon in the discharge gas while increasing the overall pressure of the discharge gas. This is an attempt to improve the ultraviolet light source not by increasing the resonant radiation (wavelength of 147 nm) from excited xenon atoms, but rather by using light over a broad spectrum focusing on 172 nm radiation from xenon excimers.

An excimer is formed by a three-body reaction between an excited xenon atom and xenon atoms in the ground state, as in the following formula.

$$Xe^{*}+Xe+Xe \rightarrow Xe_{2^{*}+Xe} \qquad \text{Formula 1}$$

Therefore, as the xenon partial pressure increases, the probability of formation rapidly increases. Furthermore, since xenon in the ground state has a repulsive potential, the excimer rapidly dissociates into single atoms without the occurrence of self-absorption. A high luminous efficiency is thus obtained even at high gas pressure.

Recent years have seen an increase in high-definition television broadcasts, such as a high-vision form of digital terrestrial broadcasting, leading to a desire for high-definition display devices. To achieve high definition, pixel size necessarily decreases. A decrease in pixel size, however, leads to a relative increase in plasma wall-loss due to an increase in bipolar diffusion. This causes the discharge voltage to rise and significantly lowers brightness and luminous efficiency. Accordingly, there is a desire for further improvement in luminous efficiency, particularly in PDPs with a small cell size.

[Citation List]

Patent Literature

Patent Literature 1: Japanese Patent Application Publication No. 2002-83543

Patent Literature 2: Japanese Patent Application Publication No. 2007-249227

SUMMARY OF INVENTION

Technical Problem

As described above, one effective way of increasing luminous efficiency in PDPs is to increase the partial pressure of xenon.

In an AC-type PDP, however, discharge electrodes are covered by a dielectric layer and a protective layer on the surface of the dielectric layer. Provision of the discharge current depends on the process of secondary electron emission due to ions penetrating the protective layer surface. Since xenon has a low ionization potential as compared to neon, xenon also has a comparatively low secondary electron emission coefficient.

Accordingly, by setting the partial pressure of xenon high, it becomes necessary to accelerate more xenon ions towards the protective layer in order to supply secondary electrons. The cathode voltage drop thus increases, resulting in a rise in discharge voltage. As the discharge voltage rises, a greater burden is placed on the drive circuitry. This leads to the undesirable result of increased costs, as high voltage parts need to be used.

Moreover, a rise in the discharge voltage causes increased ion bombardment of the protective layer by ions of the buffer gas (in many cases, neon) that is mixed with the xenon. Depending on the mixture ratio, service life may even worsen due to damage of the protective layer by sputtering.

For example, in a xenon and neon discharge gas, recklessly raising the partial pressure of xenon not only raises voltage but also makes it difficult to slow down neon ions due to a charge exchange reaction between atoms of the same type, leading to severe sputtering and reduced service life.

Accordingly, out of consideration for both reducing discharge voltage and maintaining service life, the upper limit on the partial pressure of xenon in the discharge gas is approximately 25%.

Against this background, in a high-definition PDP with a small cell size, it is necessary to develop a method for improving luminous efficiency while limiting the partial pressure of xenon to approximately 25%.

The present invention has been conceived in light of the above problems, and it is an object thereof to improve luminous efficiency in an ultra-high-definition PDP that has minute cells while keeping discharge voltage low and maintaining the service life of the PDP.

Solution to Problem

In order to solve the above problem, the present invention is a plasma display panel having a pair of opposing substrates with a gap therebetween, the gap being partitioned by ribs into a plurality of discharge cells, a pair of discharge electrodes being provided on a surface of one of the pair of opposing substrates, the surface facing the gap, and a discharge gas being enclosed in each discharge cell, wherein a minimum width of a discharge space in each discharge cell is in a range from 65 μm to 100 μm at a position adjacent to the pair of discharge electrodes, primary components of the discharge gas are xenon, neon, and helium, and in the discharge gas, a partial pressure ratio of xenon is in a range from 15% to 25%, a partial pressure ratio of helium is in a range from 20% to 50%, and total pressure is in a range from 60 kPa to 70 kPa.

The "minimum width of a discharge space in the discharge cell . . . at a position adjacent to the pair of discharge electrodes" refers to the minimum value of the width of the discharge space along the surface of the substrate on which the pair of discharge electrodes is provided.

A display device according to the present invention is provided with the above PDP and a drive circuit that drives the PDP.

The driving circuit groups a plurality of pairs of discharge electrodes into a plurality of display electrode pair groups, divides, for each display electrode pair group, one field period into a plurality of subfields, each subfield including a writing period in which a writing discharge is generated in one of the discharge cells and a sustain period in which a sustain discharge is generated in the one of the discharge cells, and sets a time of the sustain period in each subfield of each display electrode pair group to be at most $Tw \times (N-1)/N$, where N is a number of display electrode pair groups, N being an integer greater than or equal to 2, and Tw is a time necessary for performing one writing operation in all of the discharge cells in the plasma display panel.

Advantageous Effects of Invention

In an ultra-high-definition PDP that has minute cells, the present invention maintains the service life of the PDP by using xenon, neon, and helium as the primary components of the discharge gas, with the partial pressure ratio of xenon being set to 25% or less. The partial pressure ratio of helium is set to be between 20% and 50%, and the total pressure is set to be between 60 kPa and 70 kPa, which suppresses a rise in discharge voltage while obtaining high luminous efficiency.

Setting the partial pressure ratio of helium to be between 30% and 40% achieves even higher luminous efficiency.

Furthermore, the display device according to the present invention achieves high emission luminance in a high-definition PDP since the drive circuit drives the PDP by the above method. Accordingly, the display device displays images in high-definition, and with high luminous efficiency and brightness.

Note that the width of the discharge cell varies depending on the location of measurement. The reason for setting the "minimum width of a discharge space in the discharge cell . . . at a position adjacent to the pair of discharge electrodes" is that among different widths of the discharge cell, the minimum width measured near the pair of discharge electrodes has the greatest effect on luminous efficiency.

DESCRIPTION OF EMBODIMENTS

The following describes embodiments of the present invention with reference to the drawings.

Embodiment 1

PDP Structure

Figure 1:
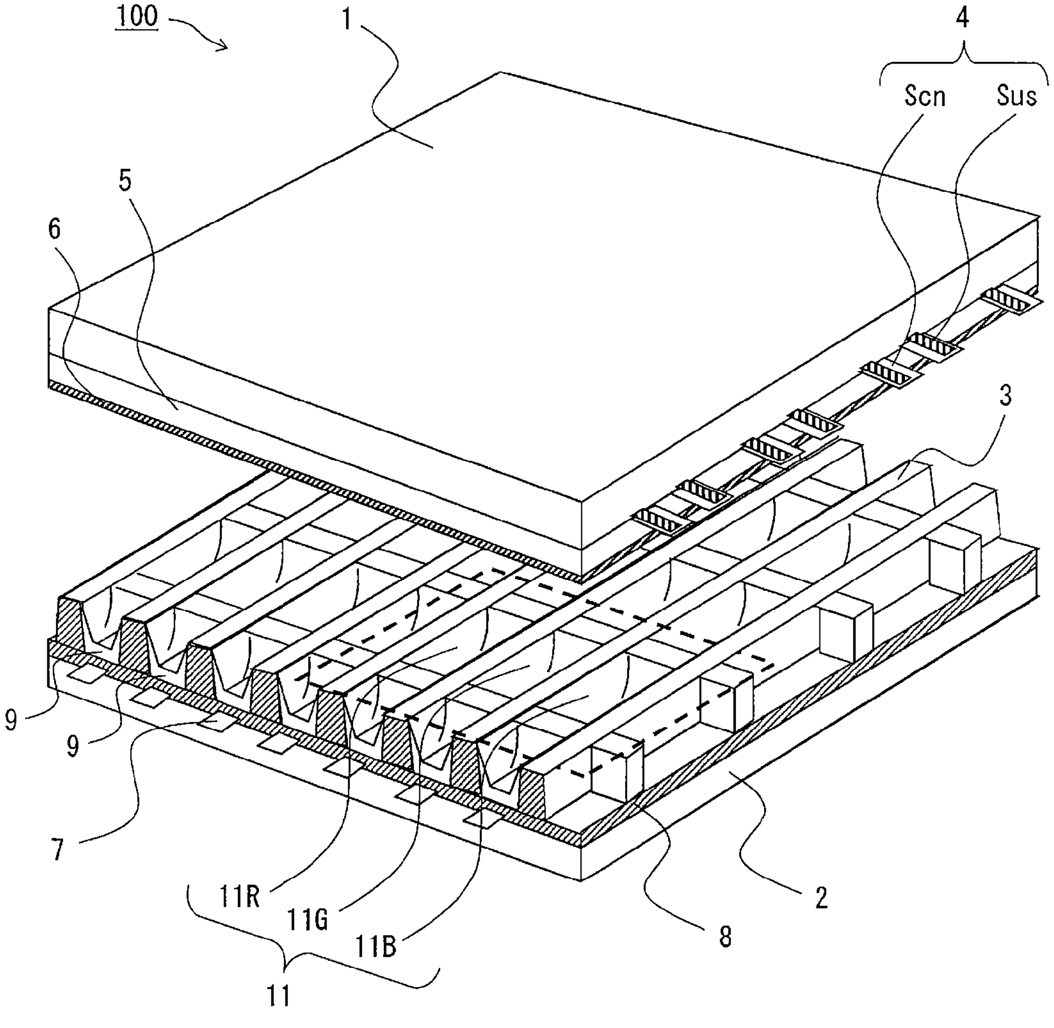
FIG. 1 is a perspective sectional view showing the structure of a PDP according to Embodiment 1.

FIG. 1 is a schematic diagram showing the structure of an AC-type PDP 100 according to Embodiment 1.

As shown in FIG. 1, the PDP 100 has a front substrate 1 and a back substrate 2, which are flat plate substrates formed from soda lime glass. Between the front substrate 1 and the back substrate 2, a low-melting-point glass paste is cast and sintered to form ribs 3 in a grid pattern. The ribs 3 define spaces enclosed by the front substrate 1 and the back substrate 2. These spaces form discharge cells 11 that are roughly rectangular parallelepipeds.

An example of the dimensions of each discharge cell 11 is a pitch L (lateral pitch) in the longitudinal direction of the ribs 3 of 95 μm, and a pitch (longitudinal pitch) in the lateral direction of the ribs 3 of 275 μm. These dimensions are to satisfy the next generation of high-vision standards (4k2k) for a 50 inch diagonal screen with 4096×2060 pixels.

Note that other than soda lime glass, the front substrate 1 and the back substrate 2 may be formed from another translucent material, such as a high melting point glass like borosilicate glass. Furthermore, using a photoreceptive paste as the material for the ribs 3 improves accuracy in the shape of the ribs 3.

On the surface of the front substrate 1 facing the discharge cells 11, a plurality of discharge electrode pairs 4 are formed by vapor deposition so as to face the discharge cells 11. Each discharge electrode 4 is composed of an electrode Sus and an electrode Scn that extend laterally. Out of consideration for light extraction, the electrodes Sus and electrodes Scn are formed from a transparent conductive material such as ITO. In order to guarantee electrical conductivity, silver is laminated on a portion of the electrodes Sus and Scn. Over the entire surface of the front substrate 1 facing the discharge cells 11, a dielectric layer 5 of silicon oxide ($SiO_2$) is formed so as to cover the sustain electrodes Sus and the scan electrodes Scn. The dielectric layer 5 is further covered by a protective layer 6, which is a vapor-deposited film of magnesium oxide. The dielectric layer 5 functions as a charge barrier with respect to the discharge current. The protective layer 6 both protects the dielectric layer 5 from sputtering due to charge bombardment from the discharge plasma and contributes to lowering the discharge voltage by providing secondary electrons during discharge.

Note that unlike the above structure, in which silver is laminated on an ITO layer, the discharge electrode pairs 4 may dispense with the ITO from the perspective of reducing costs, or another transparent conductive material may be used, such as a ZnO or $SnO_2$ based material.

On the surface of the back substrate 2 facing the discharge cells 11, stripes of data electrodes 7 correspond to the discharge cells 11 are vapor deposited longitudinally, perpendicular to the discharge electrode pairs 4. All of the discharge cells 11 are located at the intersection of a discharge electrode pair 4 along the front substrate 1 and a data electrode 7 along the back substrate 2.

Like the front substrate 1, the back substrate 2 and the data electrodes 7 are covered by a base dielectric layer 8.

A phosphor layer 9 is formed on each inner surface of the discharge cells 11, except for the surface of the front substrate 1. The phosphor layer 9 emits visible light due to excitation by ultraviolet light emitted by the xenon and other atoms during discharge.

As shown by the dotted frame in FIG. 1, the discharge cells 11 form pixels in accordance with the color of light emitted by the phosphor layer 9 formed on the inner walls of the discharge cells 11. Each pixel is a combination of three primary color cells: a red discharge cell 11R, a green discharge cell 11G, and a blue discharge cell 11B.

A discharge gas is injected into the discharge spaces partitioned by the ribs 3 between the front substrate 1 and the back substrate 2. The discharge gas is composed of xenon, neon, and helium. Further details on the composition of the discharge gas are provided below.

Operations for Discharge by the PDP

The method of driving the PDP 100 is as follows. One field is divided into a plurality of subfields. In each subfield, voltage is applied to the scan electrode Scn and the data electrode 7 to write to the discharge cells. After writing to all of the discharge cells in the panel, a predetermined alternating square-wave voltage pulse is applied between all of the sustain electrodes Sus and scan electrodes Scn.

The discharge process occurring at this point is as follows.

Applying a square-wave voltage pulse between the sustain electrodes Sus and the scan electrodes Scn creates a plasma discharge by causing the discharge gas to undergo breakdown. Positive ions (mainly xenon ions) in the plasma are accelerated by an electric field and move towards the electrode momentarily functioning as a cathode (for example, the sustain electrode Sus), and electrons are accelerated and move towards the electrode momentarily functioning as an anode (for example, the scan electrode Scn). However, since the front of the electrodes is covered by the dielectric layer 5, which functions as a charge barrier, and by the protective layer 6, neither the electrons nor the positive ions can flow to the electrodes as conduction current. Accordingly, a wall charge builds up on the surface of the protective layer 6 covering the discharge electrode pairs 4. The wall charge has the reverse polarity of the potential of the electrodes. The electric field created by the accumulated wall charge offsets the electric field due to the voltage applied to the electrodes. The electric field that contributes to discharge in the discharge cells 11 thus effectively ceases to exist, and discharge stops.

Since the voltage pulse is applied alternately to the sustain electrodes Sus and the scan electrodes Scn over a regular period, after half a period the sustain electrodes Sus switch to momentarily functioning as anodes, and the scan electrodes Scn to momentarily functioning as cathodes. At this point, the electric field created by the wall charge that accumulated during the previous discharge has the same polarity as the potential of the electrodes and thus overlaps with the applied voltage. In other words, when the voltage reverses, a voltage corresponding to (applied voltage+voltage due to wall charge) is present within the discharge cell 11. As a result, the actual voltage that needs to be applied to the discharge cell 11 to sustain discharge decreases. This also allows for ON/OFF control of discharge cells 11 with few signals by using the data electrodes 7 to perform a pixel selection operation via an address discharge.

Size of Discharge Pixels, Composition and Pressure of Discharge Gas

Figure 2:
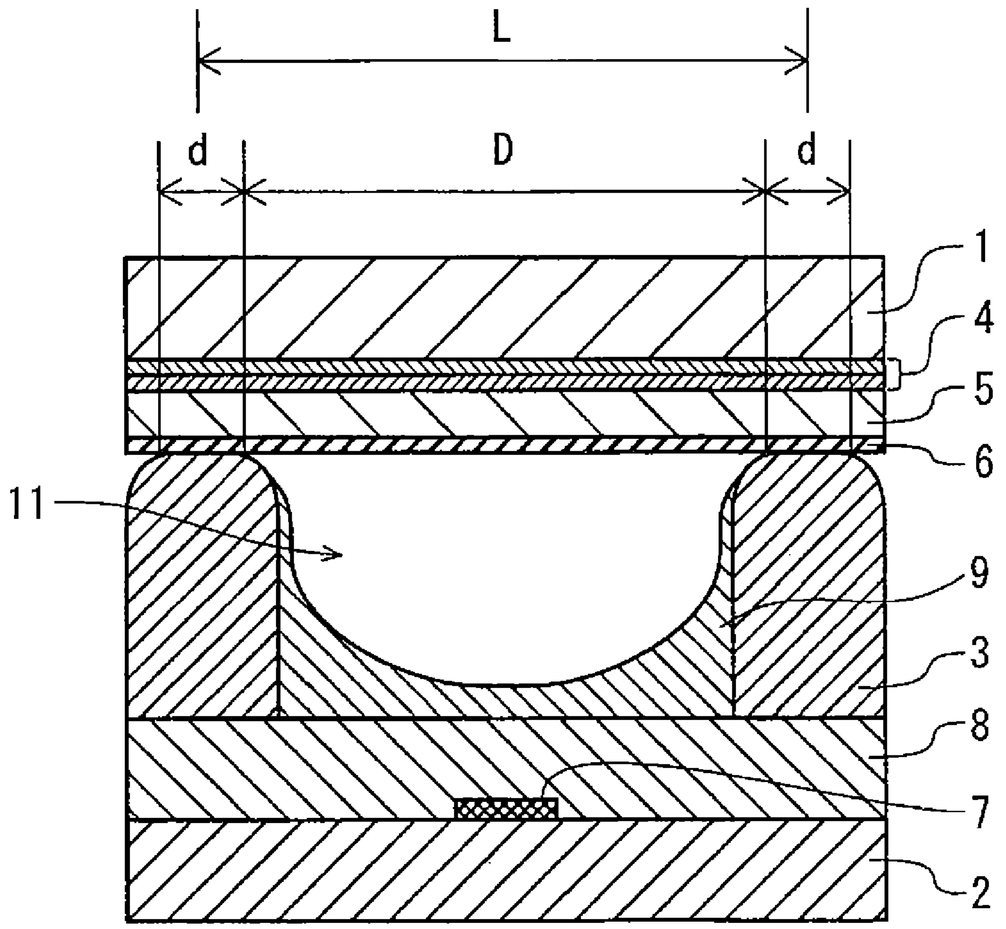
FIG. 2 shows a schematic cross section of the PDP.

FIG. 2 shows a cross-section of the PDP 100 in FIG. 1 when cut laterally. FIG. 2 corresponds to one cell.

In the PDP 100, the width D (gap between inner walls of laterally adjacent ribs 3) directly below the discharge electrode pair 4 is set in a range between 65 μm and 100 μm.

The discharge space in each discharge cell is shaped so that the width is smaller than the length of the discharge space in the longitudinal direction, as shown in FIG. 1. In other words, since the depth of the discharge cell is approximately 100 μm, the width is smaller than the height of the discharge space. The width D of the discharge space is the minimum width of the discharge space.

The size of the width D greatly affects the discharge voltage. In a surface discharge PDP such as the PDP 100, the discharge path in the discharge cells 11 is biased towards the front substrate 1 and is produced in a direction parallel to the discharge electrode pair 4 (i.e. in the direction of the width D). Therefore, as compared to the effect on the discharge voltage of the dimensions of the width D, the effect on the discharge voltage of the dimensions of the depth is relatively small.

It is thus considered reasonable to define the size of the discharge cell by the value of the width D.

An example of a preferable setting is for the width d at the top of each of the ribs 3 that extend longitudinally to be 20 μm with a pitch of 95 μm. In this case, the gap width D between ribs 3 that are adjacent in the lateral direction is 75 μm.

In the discharge gas injected into the discharge cells, the partial pressure ratio of xenon is preferably in a range from 15% to 25%, and the partial pressure ratio of helium is preferably in a range from 20% to 50%. The total pressure of the discharge gas is preferably between 60 kPa and 70 kPa.

A preferable example of the discharge gas includes xenon, helium, and neon with respective partial pressure ratios of 20%, 40%, and 40%, with a total pressure for the discharge gas of 60 kPa.

Setting the composition and pressure of the discharge gas as above yields a high luminous efficiency.

The reasons for this high luminous efficiency are described below.

Composition of Discharge Gas

In an AC-type PDP, each discharge cell 11 corresponds to one pixel of the screen (more accurately, to display of one color in a pixel). Therefore, as a discharge light emitter, the discharge cell 11 is extremely small. The distance between the electrodes that provoke the discharge (the sustain electrode Sus and the scan electrode Scn) is therefore extremely small. Based on the well-known relationship between the breakdown voltage and the product of the electrode distance and gas pressure during discharge (Paschen's law), the gas pressure inevitably has to rise in order to reduce the discharge voltage. Typically, gas pressure is on the order of $10^2$ kPa. In this pressure region, excited xenon atoms have a high probability of forming excimer due to the process of three-body collision with other atoms.

$$Xe^*+Xe+M \rightarrow Xe_{2^*+M} \quad \text{Formula 2}$$

In this formula, M is a xenon atom in the ground state, or a ground state atom of another gas included in the discharge gas, such as neon or argon.

The excimer $Xe_2$* that forms in this way highly efficiently emits ultraviolet light over a broad region, with a peak near 172 nm. After emitting ultraviolet radiation, the $Xe_2$ at a lower energy state has a repulsive potential and is therefore unstable, rapidly dissociating into two xenon atoms. Accordingly, loss of ultraviolet light due to self-absorption, as observed in resonance emission lines, does not occur.

As is clear from Formula 2, the probability of generation of an excimer dramatically increases as the gas pressure rises. Therefore, as the total pressure of the discharge gas increases, the luminous efficiency of ultraviolet rays increases. Since the probability of generation is highest when the atom M is also xenon, efficiency increases even at the same total pressure when the partial pressure of xenon increases. The efficiency should be highest when the pressure of xenon is 100%.

Xenon atoms, however, have an extremely low secondary electron emission coefficient with respect to magnesium oxide, the typical material for the protective layer. Therefore, as the partial pressure of xenon increases, the discharge voltage increases.

To avoid this problem, a rare gas with a low atomic mass number, such as neon, is typically added to an AC-type PDP, since such a rare gas has a relatively high secondary electron emission coefficient with respect to magnesium oxide.

Adding a rare gas such as neon, however, lowers the probability of generation of an excimer for the above-described reasons, thus lowering luminous efficiency. For example, in FIG. 4 of Patent Literature 2, efficiency increases as the partial pressure of argon increases, but this increase should be interpreted as follows: raising the partial pressure of argon to increase the partial pressure ratio with respect to a fixed partial pressure of xenon results in an increase in total pressure, thus increasing the probability of generation of an excimer (in this case, the M in Formula 2 is Ar). The increase in efficiency is thus small as compared to when the total pressure is increased with xenon alone.

Conventionally, therefore, when developing an AC-type PDP, it has been considered preferable to set the partial pressure of xenon high from the perspective of luminous efficiency of the discharge gas, and to adopt an appropriate discharge gas composition while keeping in mind the tradeoff with discharge voltage and service life.

In particular, AC-type PDPs for ultra-high-definition display devices with a minute cell size have an intrinsic tendency towards reduced luminous efficiency. Conventionally, then, attempts have been made to improve luminous efficiency by setting the partial pressure of xenon high when designing the discharge gas.

By contrast, the present invention adopts a different approach than such conventional technology. It was discovered that setting the partial pressure of xenon in a range from 15% to 25%, the partial pressure of helium in a range from 20% to 50%, and the total pressure of the discharge gas between 60 kPa and 70 kPa allows for highly efficient luminous display.

Experiments and Considerations

The following describes experiments and their results.

Experiment 1 (Experiment with Composition and Pressure of Discharge Gas)

Samples of a discharge gas were prepared by adding helium to a gas including a mixture of xenon and neon. In each discharge gas sample, the partial pressure ratio of xenon was kept constant at 20%, whereas the partial pressure ratio of helium was varied in a range from 0% to 50%.

The prepared discharge gas samples were injected into panels to create experiment panels. The total pressure of injected discharge gas was varied in a range from 30 kPa to 70 kPa. The cell pitch in each experiment panel was 95 μm (discharge space width D=75 μm). These dimensions satisfy the next generation of high-vision standards (4k2k) for a 50 inch diagonal screen with 4096×2060 pixels.

While driving each experiment panel, luminance was measured using a luminance meter provided vertically above each panel. The measured luminance was then integrated over the entire light-emitting area and entire solid angle of the experiment panel to calculate total luminous flux. Next, the luminous efficiency (lm/W) was calculated by seeking the power consumption of each experiment panel when turned ON, based on the sustain voltage and the panel discharge current, and dividing the total luminous flux by this power consumption.

Note that the panel discharge current was the total current flowing when the panel was ON, minus the charging current flowing to capacitance components, such as the discharge electrode pair 4, when the panel was OFF.

Figure 3:
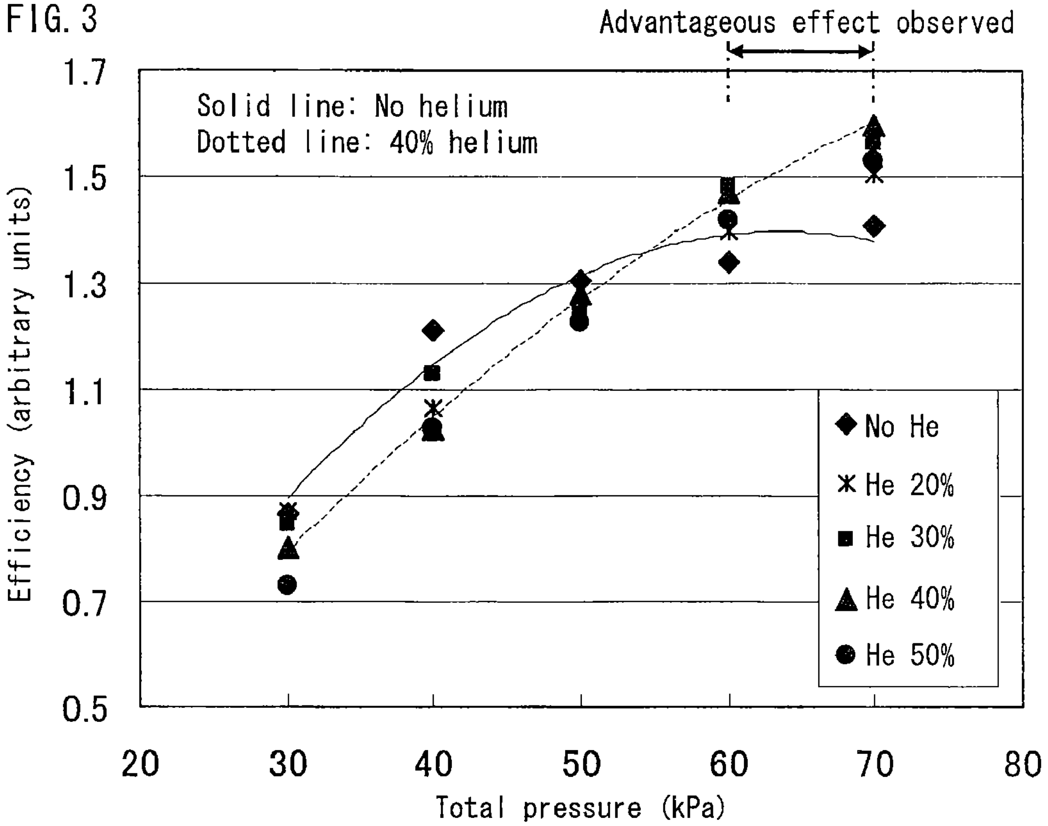
FIG. 3 is a characteristic diagram showing the relationship between total pressure of the discharge gas and luminous efficiency in experimental PDPs.
Figure 4:
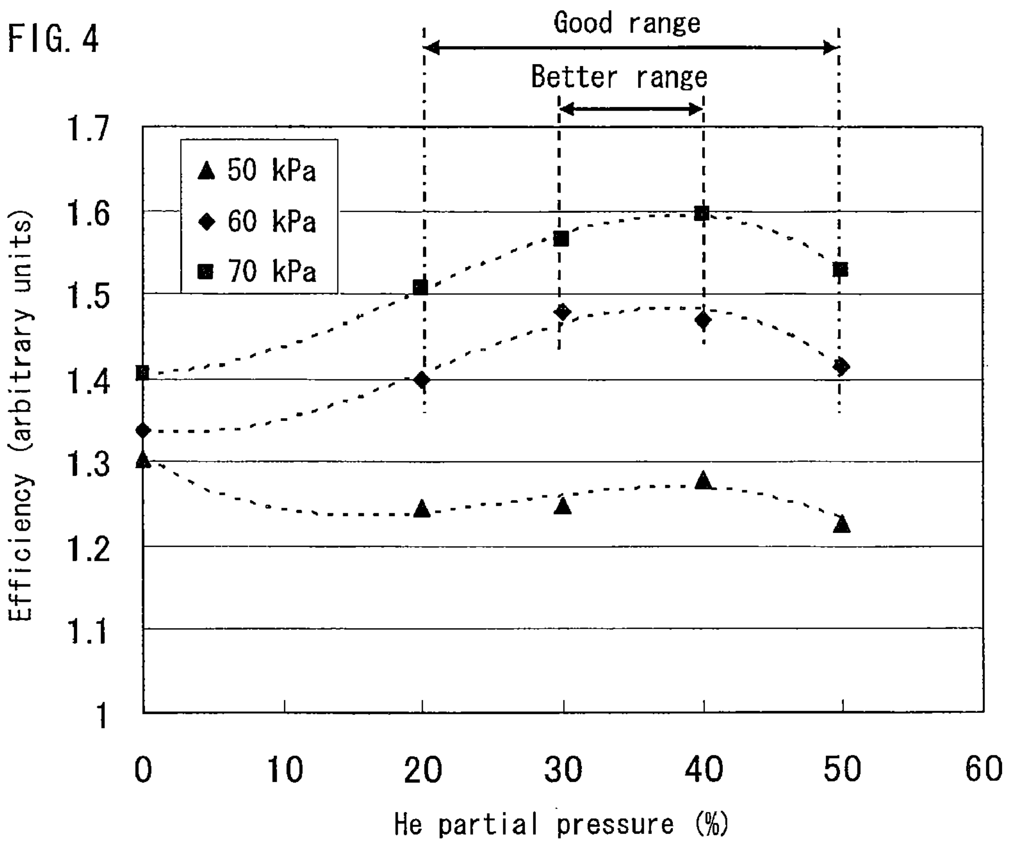
FIG. 4 is a characteristic diagram showing the relationship between the partial pressure ratio of helium and luminous efficiency in experimental PDPs.
Figure 5:
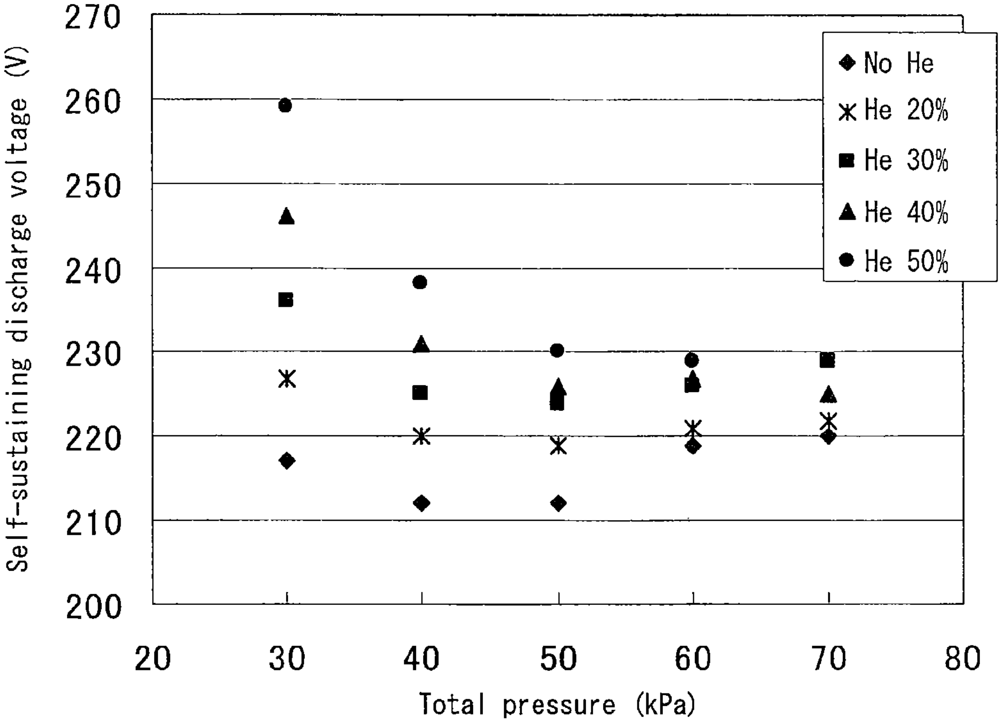
FIG. 5 is a characteristic diagram showing the relationship between total pressure of the discharge gas and self-sustaining discharge voltage in experimental PDPs.

FIGS. 3 to 5 show the results of measurement. In FIG. 3, the total pressure of the mixed gas is plotted on the horizontal axis, and luminous efficiency is plotted on the vertical axis.

Based on FIG. 3, it is clear that for any partial pressure ratio of helium, efficiency generally grows higher as the total pressure increases. When no helium is included, it was also observed that the increase in efficiency reaches a peak in a total pressure region of 50 kPa or greater. This is similar to the data disclosed in FIG. 5 of Patent Literature 2.

When adding helium, however, the increase in efficiency did not reach a similar peak above 50 kPa, instead increasing nearly linearly with respect to the total pressure.

Based on FIG. 3, it is clear that a total pressure of approximately 50 kPa acts as a border: in a lower pressure region, lower efficiency is obtained when helium is added than when it is not, and in a higher pressure region, this tendency is reversed, so that a ternary system with the addition of helium is the most efficient.

In FIG. 4, the partial pressure of helium is plotted on the horizontal axis and luminous efficiency is plotted on the vertical axis for total pressures of 50 kPa, 60 kPa, and 70 kPa.

As is clear from the results shown in FIG. 4, efficiency decreases by adding helium at a total pressure of 50 kPa. On the other hand, for total pressures of 60 kPa and 70 kPa, an increase in efficiency is observed when adding between 20% and 50% helium. In particular, a peak in efficiency is observed in a range of 30% to 40% for the partial pressure ratio of helium.

In such a high total pressure region of 60 kPa to 70 kPa, a good increase in efficiency is obtained with a partial pressure ratio of helium in a range from 20% to 50%. In particular, a range of 30% to 40% for the partial pressure ratio of helium yields an even better increase in efficiency.

In FIG. 5, total pressure is plotted on the horizontal axis, and the self-sustaining discharge voltage is plotted on the vertical axis for each partial pressure ratio of helium.

As is clear from the results shown in FIG. 5, the self-sustaining discharge voltage rises by adding helium.

When no helium is added, the self-sustaining discharge voltage with respect to total pressure forms a curve, similar to Paschen's law, having a local minimum. As the partial pressure of helium rises, however, this local minimum becomes shallower. At a partial pressure of helium of 40% or greater, the self-sustaining discharge voltage undergoes a nearly level decrease as the total pressure rises over 50 kPa.

In FIG. 5, in a range of 60 kPa to 70 kPa for the total pressure of the discharge gas, the discharge voltage only changes by approximately 10 V even when the partial pressure of helium varies in a range of 0% to 50%. It is thus clear that the self-sustaining discharge voltage rises little even when adding helium.

The present experiments were performed with a partial pressure ratio of xenon of 20% within the discharge gas. The same results were also achieved by performing a similar experiment with the partial pressure ratio of xenon in a range from 15% to 25%.

Experiment 2 (Dependency of Rise in Luminous Efficiency on Discharge Space Width)

In order to confirm that the effect on luminous efficiency of adding helium to the xenon/neon discharge gas differs depending on the discharge space width, experiment panels were newly created with a cell pitch of 150 μm (discharge space width D=120 μm) and a cell pitch of 120 μm (discharge space width D=100 μm), and a similar experiment to Experiment 1 was performed. Note that the depth of all of the discharge cells was approximately 100 μm.

The former dimensions approximately correspond to the cell size for a 42 inch full-high-vision panel, which has already been released on the market by various companies and is becoming the standard for home digital television. The later dimensions correspond to cell size in a 37 inch full-high-vision panel.

Figure 6:
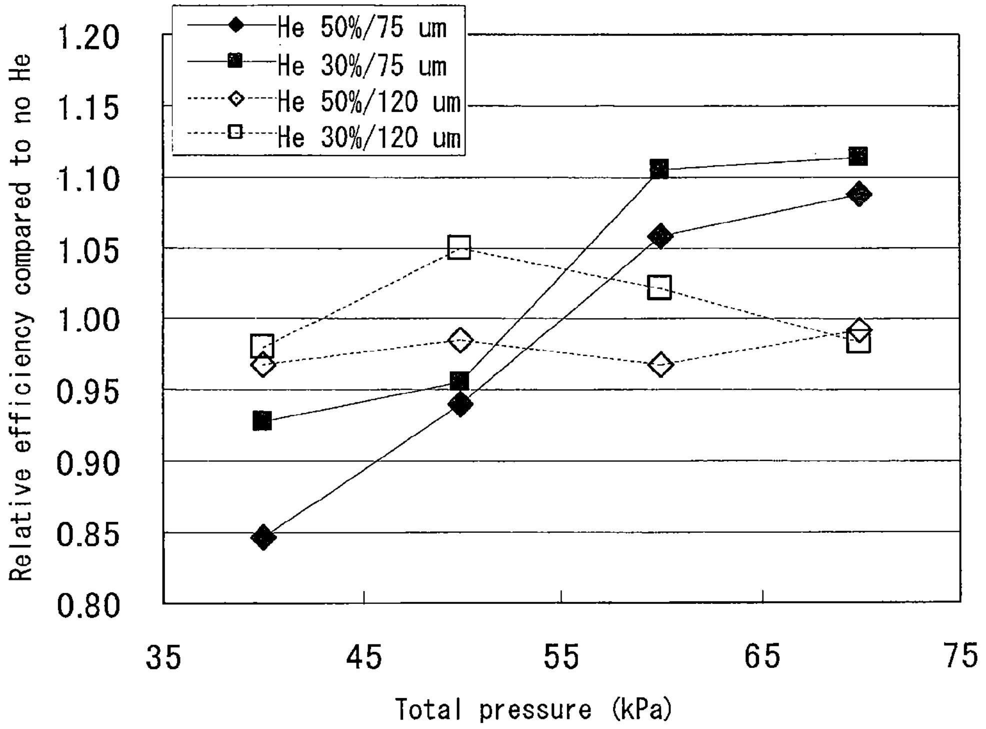
FIG. 6 is a characteristic diagram showing the relationship between total pressure of the discharge gas and relative efficiency for various partial pressure ratios of helium and discharge space widths in experimental PDPs.

FIG. 6 shows the luminous efficiency obtained while varying the total pressure of injected gas in experiment panels with a discharge space width D of 120 μm and a discharge space width D of 75 μm, and with an added amount of helium in the discharge gas of 30% and of 50%. FIG. 6 is a characteristics diagram showing the results of the experiment, namely the relationship between total pressure and luminous efficiency. The luminous efficiency is shown as a relative efficiency, with the luminous efficiency when not adding helium being one for each cell size.

In FIG. 6, the results for the experiment panels that, based on the embodiment, had a discharge space width D of 75 μm are shown by solid lines and solid black data points, whereas the results for the experiment panels that, based on the comparative example, had a discharge space width D of 120 μm are shown by dotted lines and white data points with a black outline.

In the panel with a discharge space width D of 75 μm, as described above, a total pressure of approximately 50 kPa acts as a border, with greater efficiency in a lower pressure region when helium is not added, and greater efficiency in a higher pressure region when helium is added.

By contrast, in the panel with a discharge space width D of 120 μm, no such dependency on the total pressure was observed. Furthermore, the improvement in luminous efficiency due to the addition of helium was not confirmed.

Therefore, even if helium is added to the discharge gas in a PDP, the effect on the luminous efficiency varies according to the discharge space width.

Figure 7:
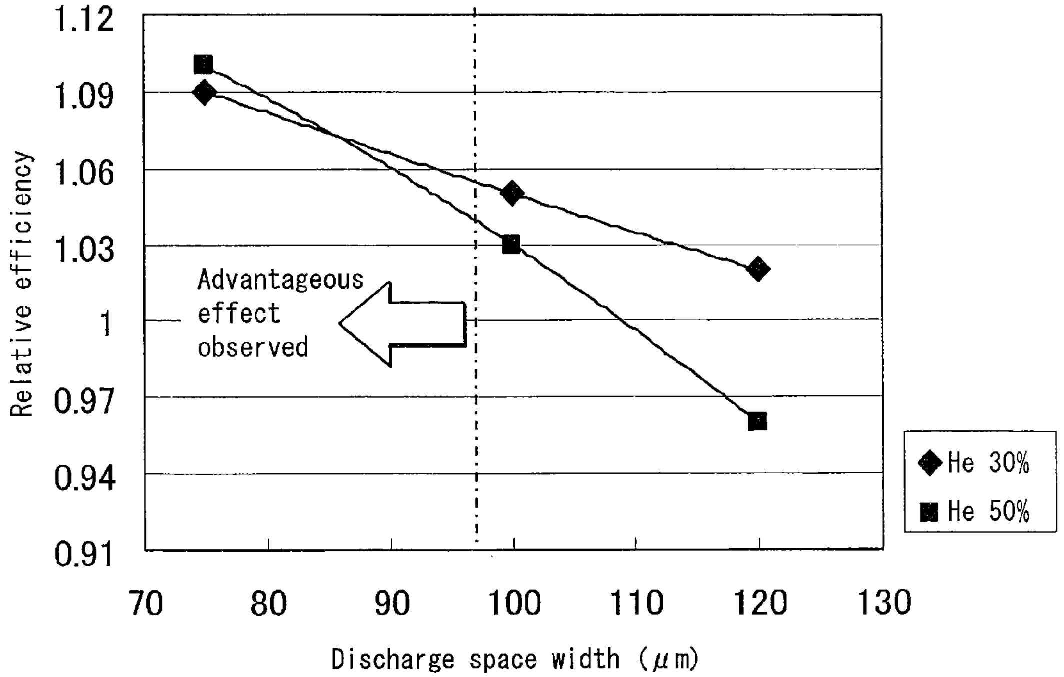
FIG. 7 is a characteristic diagram showing the relationship between discharge space width and relative efficiency for various partial pressure ratios of helium in experimental PDPs.

FIG. 7 is a characteristics diagram showing the relationship between discharge space width and luminous efficiency for a PDP to which 30% helium is added and a PDP to which 50% helium is added.

In FIG. 7, the luminous efficiency is plotted as a relative efficiency, with the luminous efficiency when not adding helium being one for each discharge space width.

As also shown in FIG. 6, the results shown in FIG. 7 indicate that the increase in luminous efficiency due to the addition of helium strongly depends on the width of the discharge space. In other words, as the discharge space width grows narrower, the rise in the luminous efficiency due to the addition of helium grows more salient.

As the results in FIG. 7 indicate, the luminous efficiency rises by 3% or more when the discharge space width D is in a range of 100 μm or less for a partial pressure ratio of helium of either 30% or 50%. Accordingly, it is clear that in a range of 100 μm or less for the discharge space width D, luminous efficiency increases by adding helium. By contrast, the results in FIG. 7 also show that when the discharge space width D exceeds 100 μm, luminous efficiency cannot be expected to improve much even when adding helium.

Accordingly, in PDPs, the effect of an increase in luminous efficiency due to the addition of helium to the discharge gas is clearly unique to small cell size PDPs that have a discharge space width D of 100 μm or less.

Looking at the results shown in FIG. 7 of Patent Literature 2, the increase in efficiency due to the addition of helium is limited to a region in which the partial pressure ratio of xenon is extremely low. When the partial pressure ratio of xenon is 20%, the increase in efficiency due to addition of helium is 2% or less. The results disclosed in Patent Literature 2 do not contradict the experimental results shown in FIGS. 5 and 6. While not clearly stated in Patent Literature 2, the PDP used in Patent Literature 2 can be assumed to have a relatively large discharge space width.

Furthermore, in the PDP disclosed in Patent Literature 2, the partial pressure ratio of xenon in the discharge gas is approximately 10%, and neon and helium are also added. As described above, however, by decreasing the minimum width D of the cell to 100 μm or less, the luminous efficiency intrinsically lowers. Therefore, it would be difficult to obtain a brightness that is practical for televisions using the settings for the discharge gas disclosed in Patent Literature 2.

Figure 8:
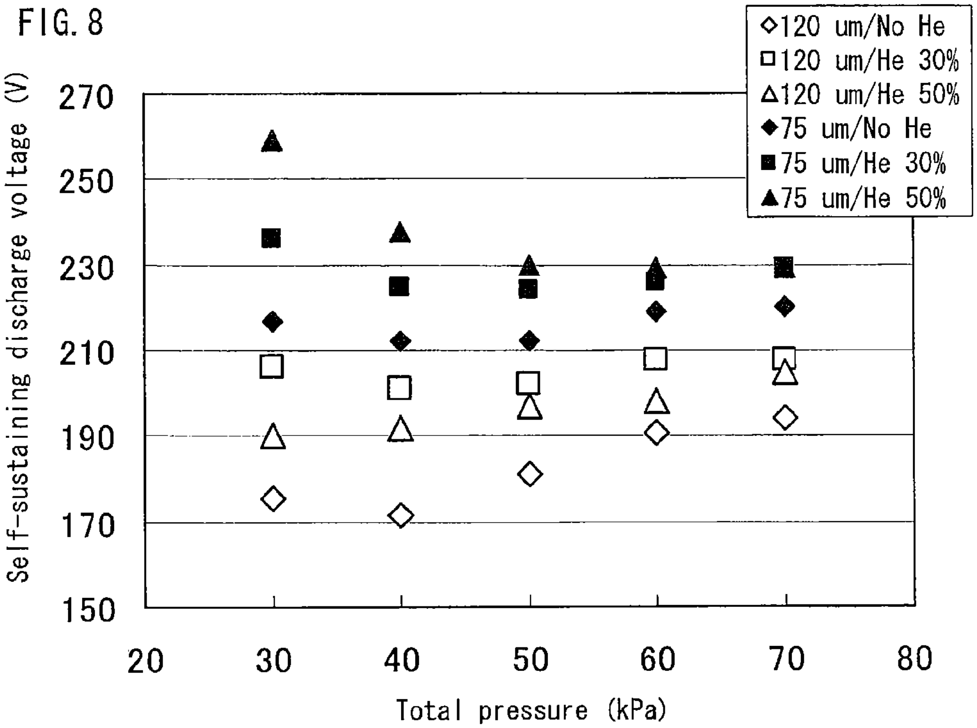
FIG. 8 is a characteristic diagram showing the relationship between total pressure and self-sustaining discharge voltage for various partial pressure ratios of helium and discharge space widths in experimental PDPs.

FIG. 8 is a characteristics diagram plotting the relationship between total pressure and self-sustaining discharge voltage for PDPs having a discharge space width D of 75 μm and 120 μm, and having no helium, helium at a partial pressure ratio of 30%, and helium at a partial pressure ratio of 50%. FIG. 8 shows the dependency of self-sustaining discharge voltage on total pressure.

In all cases, self-sustaining discharge voltage is high for a discharge space width D of 75 μm, indicating that loss is large when the discharge space is narrow. For a discharge space width D of 120 μm as well, the behavior of self-sustaining discharge voltage with respect to total pressure is roughly similar to when the discharge space width D is 75 μm.

What is of particular note is the degree of increase in the self-sustaining discharge voltage due to the addition of helium. The difference in voltage between no helium and 50% helium is larger when the discharge space width D is 120 μm. Whereas the difference is approximately 10 V for a discharge space width D of 75 μm at a total pressure of 60 kPa, which are settings used in the present embodiment, the difference is larger for a discharge space width D of 120 μm: 18 V.

In this way, with a smaller discharge space width, the rise in self-sustaining discharge voltage (a disadvantage) due to the addition of helium becomes relatively smaller.

Consideration of Reason for an Increase in Luminous Efficiency Due to Addition of Helium In PDPs with a small cell size and a narrow discharge space width, luminous efficiency increases by adding helium to xenon/neon discharge gas as described above. The reason for this increase is now considered.

First, the discharge process using Xe is considered.

Upon being bombarded by an electron, a xenon atom ionizes upon receiving 12.13 eV of energy from the electron, thus forming a xenon ion. This reaction is referred to as a direct (collisional) ionization process and is expressed as follows.

$$Xe+e \rightarrow Xe^{+}+2e \quad \text{Formula 3}$$

Xenon atoms are crucial, since xenon atoms at the excitation level with the lowest energy (first excitation level) emit so-called resonance lines of ultraviolet light at 147 nm. Furthermore, xenon atoms can become an excimer and emit highly efficient light centering on wavelengths around 172 nm. Excimers are formed by a direct (collisional) excitation process.

$$Xe+e \rightarrow Xe^{*}+e \quad \text{Formula 4}$$

Note that xenon atoms have a higher ionization energy, 12.13 eV, and first excitation energy, approximately 8.4 eV, than mercury (ionization energy of 10.38 eV), which is often used in fluorescent lamps for ordinary lighting. In order to efficiently sustain plasma, therefore, electrons with high energy are necessary.

The discharge mechanism in a PDP is referred to as dielectric barrier discharge. As shown in FIG. 1, the dielectric layer 5 and the protective layer 6 are provided between the discharge electrode pair 4 and the discharge space, thus forming a current barrier. Discharge occurs over the following steps.

(I) Upon application of voltage across the Scn electrode and the Sus electrode, accidental electrons within the discharge space are accelerated in the direction of the electric field (from the cathode towards the anode).

(II) Upon receiving sufficient kinetic energy due to acceleration by the electric field, an electron collides with an atom in the discharge gas, and the atom ionizes by collision, yielding an ion and a new electron.

(III) The new electron released by ionization is also accelerated in the direction of the electric field, causing another ionization. As a result, the number of electrons increases exponentially, and electron-ion pairs (i.e. plasma) form at a high density near the front surface of the anode. Since plasma near the front surface of the anode is conductive, the electric field distribution becomes distorted by the plasma, with the electric field concentrating by the tip of the plasma by the cathode.

(IV) Electrons are greatly accelerated by the tip of the plasma where the electric field is concentrated, and ionization proceeds rapidly, resulting in growth of the plasma towards the cathode.

(V) Ions produced at this point accelerate towards the cathode, colliding with the protective layer by the cathode and releasing secondary electrons. These secondary electrons also proceed towards the anode, and discharge continues. Ions that collide with the protective layer are blocked by the current barrier, gathering along the front surface of the cathode to form a wall charge that offsets the applied voltage.

(VI) As the plasma continues to grow, the applied voltage concentrates between the tip of the plasma and the cathode, since internally the plasma has a nearly equal potential. A high electric field at a cathode fall region thus forms. At the cathode fall region, ions are accelerated towards the surface of the cathode by the high electric field in order to sustain current, releasing secondary electrons and accumulating as a wall charge.

(VII) As the amount of the wall charge increases, the applied voltage is eventually offset by the wall charge, becoming lower than the breakdown voltage. Discharge thus stops. In the above process, the following are important considerations for increasing efficiency in the PDP.

(1) The efficiency of secondary electron emission from the protective layer, which is necessary for furthering and maintaining discharge, should be increased.

(2) In order to generate abundant xenon atoms in the first excitation level Xe*, electron temperature should be increased. To that end, the electric field strength should be increased while discharge continues.

Next, the significance of adding helium to the discharge gas that includes xenon is considered.

At 24.6 V, the ionization potential of helium is extremely high. A high secondary electron emission coefficient can thus be expected when ions collide with the protective layer. Furthermore, since the atomic mass number is low and mobility is high, ions are easily accelerated at the cathode fall region and can arrive at the protective layer. In other words, abundant secondary electrons can be obtained with a lower ion current.

Furthermore, although ion current is hindered by a charge exchange reaction due to collision of atoms and ions of the same type in the cathode fall region, the relative partial pressure of neon is reduced by adding helium to the xenon/helium gas. Neon ions thus easily accelerate, since the charge exchange reaction of neon is suppressed. This also leads to suppression of ion current, increasing the efficiency of discharge of secondary electrons.

As described above, since the majority of the applied voltage concentrates at the cathode fall region as discharge develops, the power consumed during discharge can be considered substantially equal to the product of the voltage in the cathode fall region and the ion current. Reducing the ion current directly leads to a reduction in power consumption.

On the other hand, helium has a high ionization potential, making ionization difficult. Accordingly, increasing the partial pressure of helium requires an increase in the applied voltage to create helium ions. Since the plasma density and conductivity lower, however, the electric field strength inside the plasma increases, leading to a rise in electron temperature. As a result, the excitation efficiency of xenon increases, thus improving luminous efficiency.

Based on the above considerations, it can be estimated to some degree that adding an appropriate amount of helium will increase the luminous efficiency of a PDP.

In order to obtain the increase in luminous efficiency due to helium, it is necessary for the helium in the discharge gas to sufficiently ionize, yielding helium ions. In a PDP with a narrow discharge space width, as in the present embodiment, helium ions can easily exist, and therefore the increase in luminous efficiency is actually obtained. This point is described with reference to FIG. 8.

In FIG. 8, the self-sustaining discharge voltage is approximately 190 V for a total pressure of 60 kPa in a PDP with a discharge space width D of 120 μm and no helium. By contrast, when the discharge space width D is 75 μm, the self-sustaining discharge voltage is higher, reaching approximately 220 V. In such a PDP with a narrow discharge space width, the self-sustaining discharge voltage intrinsically rises. Since the field strength in the discharge space increases, however, helium easily ionizes, thus making it easy for helium ions to exist.

On the other hand, as described with reference to FIG. 6, in a PDP with a discharge space width of 120 μm, the luminous efficiency does not increase despite the addition of helium. The reason is considered to be that the electric field in the discharge space is low, leading to insufficient helium ionization.

While the above experiment was performed with a small experiment panel, during other investigation the present inventors observed that the discharge voltage rises when increasing the panel size, so that the discharge voltage in an actual 42 inch or 50 inch PDP that is approximately 30 V to 50 V higher than in the experimental results.

Upon observing an actual PDP, it is clear that setting the discharge space width to be low leads to increased self-sustaining discharge voltage, as in the above experiment results. For example, PDPs with a discharge space width of 120 μm have been commercialized as 42 inch full-high-vision televisions. Based on the results in FIG. 8, if helium is added to such a PDP, the self-sustaining discharge voltage can be expected to rise by approximately 20 V. In this case, it becomes necessary to use higher voltage parts for circuit components than are currently in use, which leads to increased costs.

On the other hand, in a panel with a discharge space width of 75 μm, corresponding to a 50 inch 4k2k standard, high voltage parts are indispensible from the start. Therefore, an increase in voltage of approximately 10 V due to the addition of helium does not lead to increased costs.

Other Considerations on Experiments

The above experiments were performed with a 20% partial pressure ratio of xenon. When experiments were performed changing the partial pressure ratio of xenon in a range from 15% to 25%, similar results were obtained with no large change in the characteristics.

On the other hand, when the xenon partial pressure ratio was less than 15%, the luminous efficiency dropped dramatically, and when the xenon partial pressure ratio was over 25%, the self-sustaining discharge voltage rose. Neither of these results is desirable.

In the above experiments, the minimum width of the discharge space was set to 75 μm. As described above, a greater effect can theoretically be expected with a smaller discharge space width.

Mainly due to problems in the manufacturing process, however, manufacturing a PDP with an extremely small cell pitch increases the probability of defects, which is not desirable. Based on considerations by the present inventors, the discharge space width for the smallest cell pitch that allows for stable formation of the discharge space is approximately 65 μm.

The above changes in the self-sustaining discharge voltage due to cell size and changes in behavior due to the discharge gas can be quantitatively grasped by actually making a test PDP and performing experiments. The present inventors were the first in the world to make a prototype of an ultra-high-definition panel that allows for 4k2k resolution with a 50 inch screen size. By performing experiments, the present inventors discovered that conditions that allow for both high efficiency and long service life exist only in an extremely small discharge space having a width of 100 μm or less.

Inclusion of Components Other than Xenon, Neon, and Helium in the Discharge Gas

Components other than xenon, neon, and helium may be included in the discharge gas at a certain impurity level (approximately 10 ppm or less). Inclusion of other gas components at a higher level, however, is not preferable, since such inclusion leads to a rise in discharge voltage and a reduction of luminous efficiency.

The main reasons are as follows.

When manufacturing a PDP, molecular gases such as oxygen, nitrogen, or carbon dioxide may mix with the discharge gas, particularly during the regular exhaust and gas injection process. If such molecular gasses exist within the discharge gas, the vibrational/rotational level within the plasma is easily excited. As a result, the electron temperature drops dramatically, lowering the excitation efficiency of xenon.

Furthermore, other noble gasses that are monatomic molecules (argon, krypton) have a lower ionization potential than neon and helium. Inclusion of these noble gasses thus lowers the ionization probability of neon and helium.

As a result, the secondary electron emission coefficient lowers, and the effect of improved discharge efficiency due to helium ions is reduced, thereby also leading to a rise in self-sustaining discharge voltage and a reduction in luminous efficiency.

Embodiment 2

The structure of the PDP in the present embodiment is similar to the PDP described in Embodiment 1. The method of driving the PDP, however, is the pure wave driving method.

Figure 9:
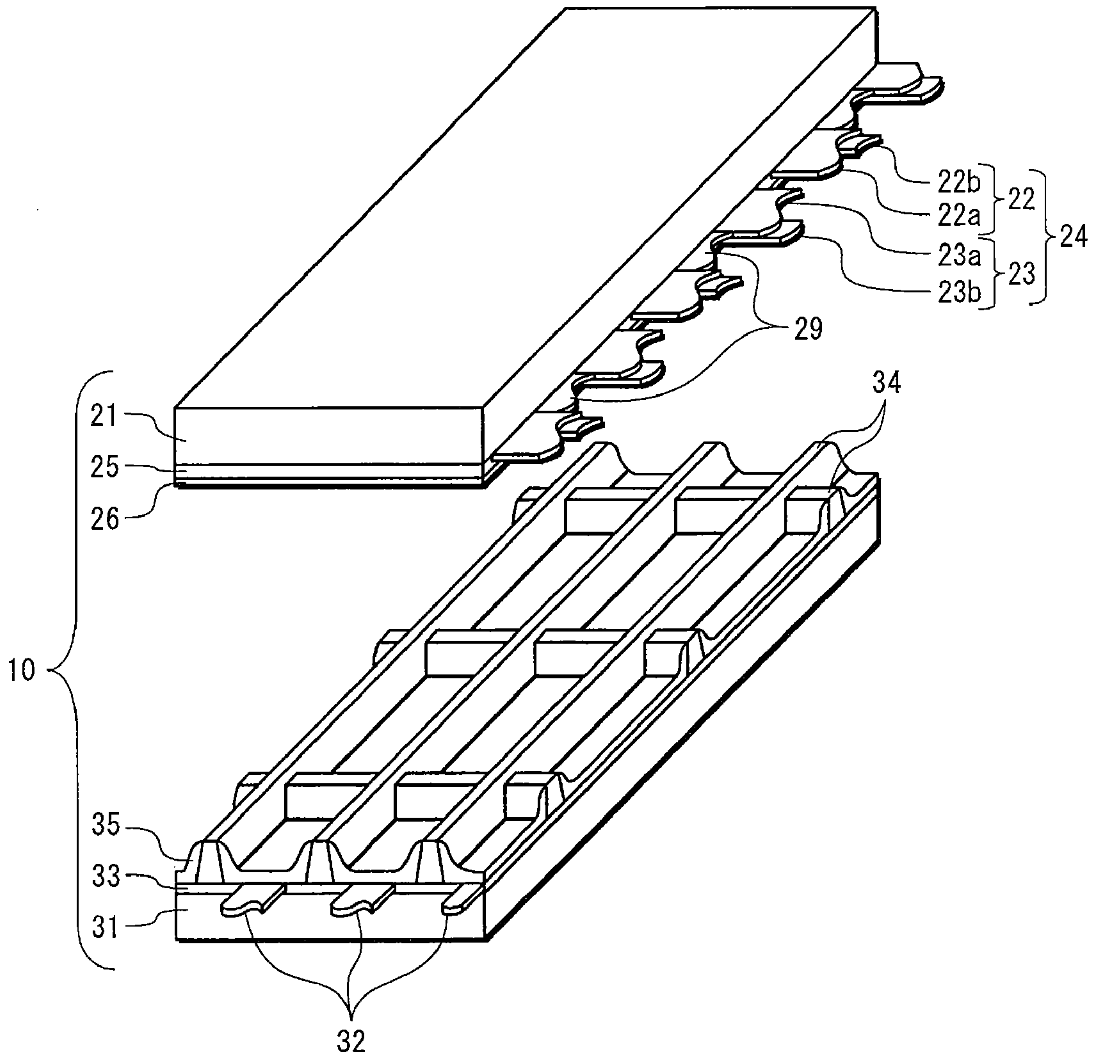
FIG. 9 is a perspective sectional view of a PDP according to Embodiment 2.

FIG. 9 is a partial perspective view showing the configuration of a PDP 10 according to the present embodiment.

On a transparent, insulating front substrate 21, a plurality of display electrode pairs 24 each composed of a scan electrode 22 and a sustain electrode 23 are provided. A dielectric layer 25 is provided covering the discharge electrode pairs 24. A protective layer 26 is further provided on the dielectric layer 25. Each scan electrode 22 has a transparent electrode 22*a*, and each sustain electrode 23 similarly has a transparent electrode 23*a*. Bus electrodes 22*b* and 23*b* are laminated on the transparent electrodes 22*a* and 23*a*.

On an insulating back substrate 31, a plurality of data electrodes 32 are provided, and a dielectric layer 33 is provided to cover the data electrodes 32. Furthermore, barrier walls 34 in a grid pattern are provided on the dielectric layer 33. On the lateral surface of each barrier wall 34 and on the dielectric layer 33, a phosphor layer 35 emitting red, green, and blue light is provided.

The front substrate 21 and the back substrate 31 face each other with a minute discharge space therebetween, so that the display electrode pairs 24 are perpendicular to the data electrodes 32. The outer circumferential portion thereof is sealed with a sealing material such as glass frit.

A mixed discharge gas whose primary components are xenon, neon, and helium is injected into the discharge space. The partial pressure ratio of xenon is 15% to 25% and the partial pressure ratio of helium is 20% to 50%. The total pressure of the discharge gas is 60 kPa to 70 kPa.

The discharge space is divided into a plurality of sections by the barrier walls 34, and discharge cells are formed at each intersection of the display electrode pairs 24 and the data electrodes 32. An image is displayed on the PDP 10 by discharge and light emission in these discharge cells.

Note that the structure of the PDP 10 is not limited to the above structure. For example, the barrier walls may be provided in stripes.

Figure 10:
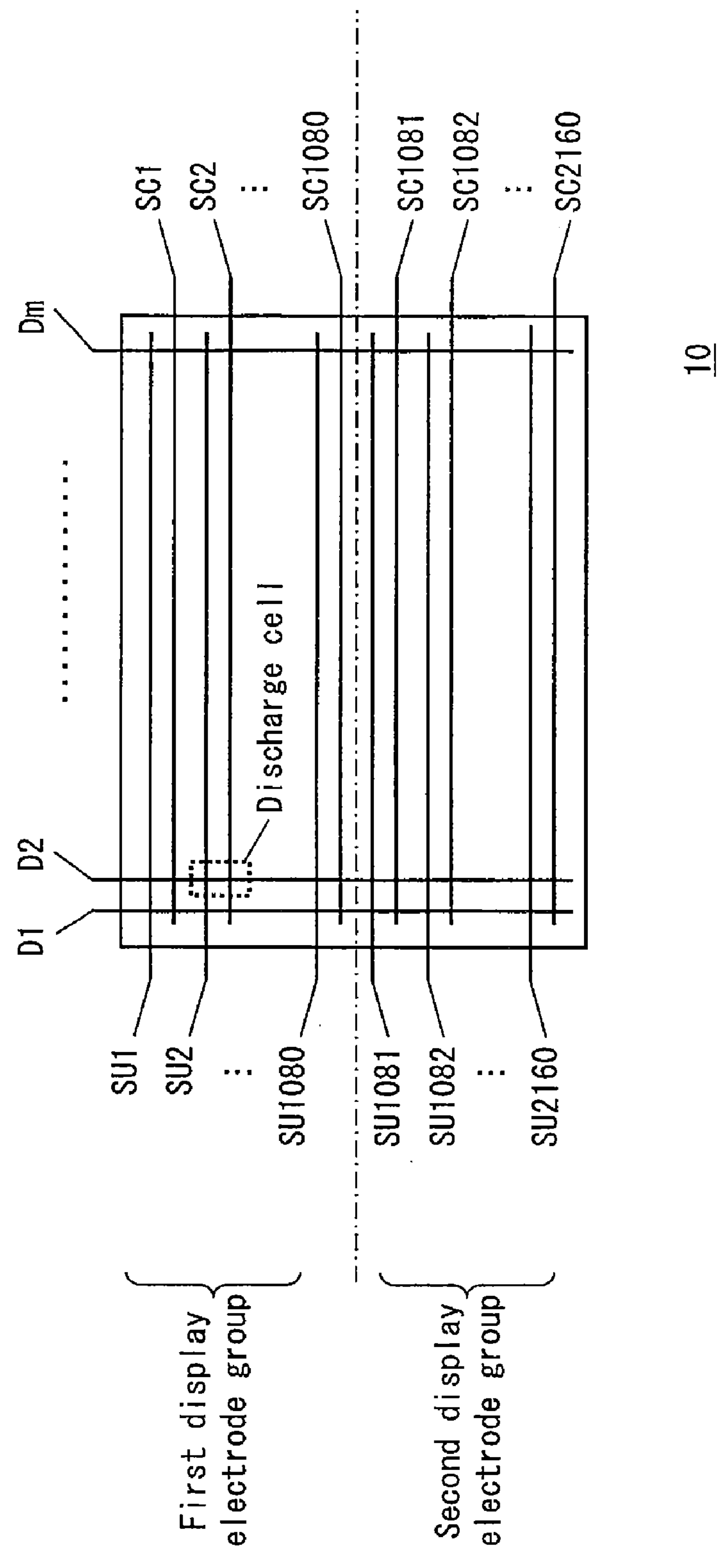
FIG. 10 shows an arrangement of electrodes in the PDP.

FIG. 10 shows an arrangement of electrodes in the PDP 10. In the PDP 10, n scan electrodes SC1 to SCn (scan electrode 22 in FIG. 9) and n sustain electrodes SU1 to SUn (sustain electrode 23 in FIG. 9) extend in the row direction, whereas m data electrodes D1 to Dm (data electrodes 32 in FIG. 9) extend in the column direction. A discharge cell is formed where a pair of a scan electrode SCi (i=1−n) and a sustain electrode SUi intersect one data electrode Dj (j=1−m). The discharge space has m×n discharge cells formed therein. Although the number n of the display electrode pairs is not particularly limited, n is 2160 in this embodiment.

The 2160 display electrode pairs composed of scan electrodes SC1 to SC2160 and sustain electrodes SU1 to SU2160 are grouped into a plurality of display electrode pair groups. In the present embodiment, the display electrode pairs are divided into two groups in an upper and a lower half of the PDP. The method of dividing display electrode pairs into groups is described below. As shown in FIG. 10, the display electrode pairs in the upper half of the panel belong to a first display electrode pair group, and the display electrode pairs in the lower half of the panel belong to a second display electrode pair group. In other words, 1080 scan electrodes SC1 to SC1080 and 1080 sustain electrodes SU1 to SU1080 belong to the first display electrode pair group, and 1080 scan electrodes SC1081 to SC2160 and 1080 sustain electrodes SU1081 to SU2160 belong to the second display electrode pair group.

Next, the method of driving the PDP 10 is described. In the present embodiment, the timing of scan pulses and writing pulses is set so that, except for an initialization period, writing operations are performed continuously.

FIGS. 11A to 11D illustrate a method of setting a subfield structure in the plasma display device according to Embodiment 2. In FIGS. 11A to 11D, scan electrodes SC1 to SC2160 are shown on the vertical axis, and time is shown on the horizontal axis. The timing of performing a writing operation is represented by a solid line, whereas the timing of a sustain period and an erase period is represented by hatching. In the following explanation, the time of one field period is 16.7 ms.

Figures 11A, 11B, 11C, 11D:
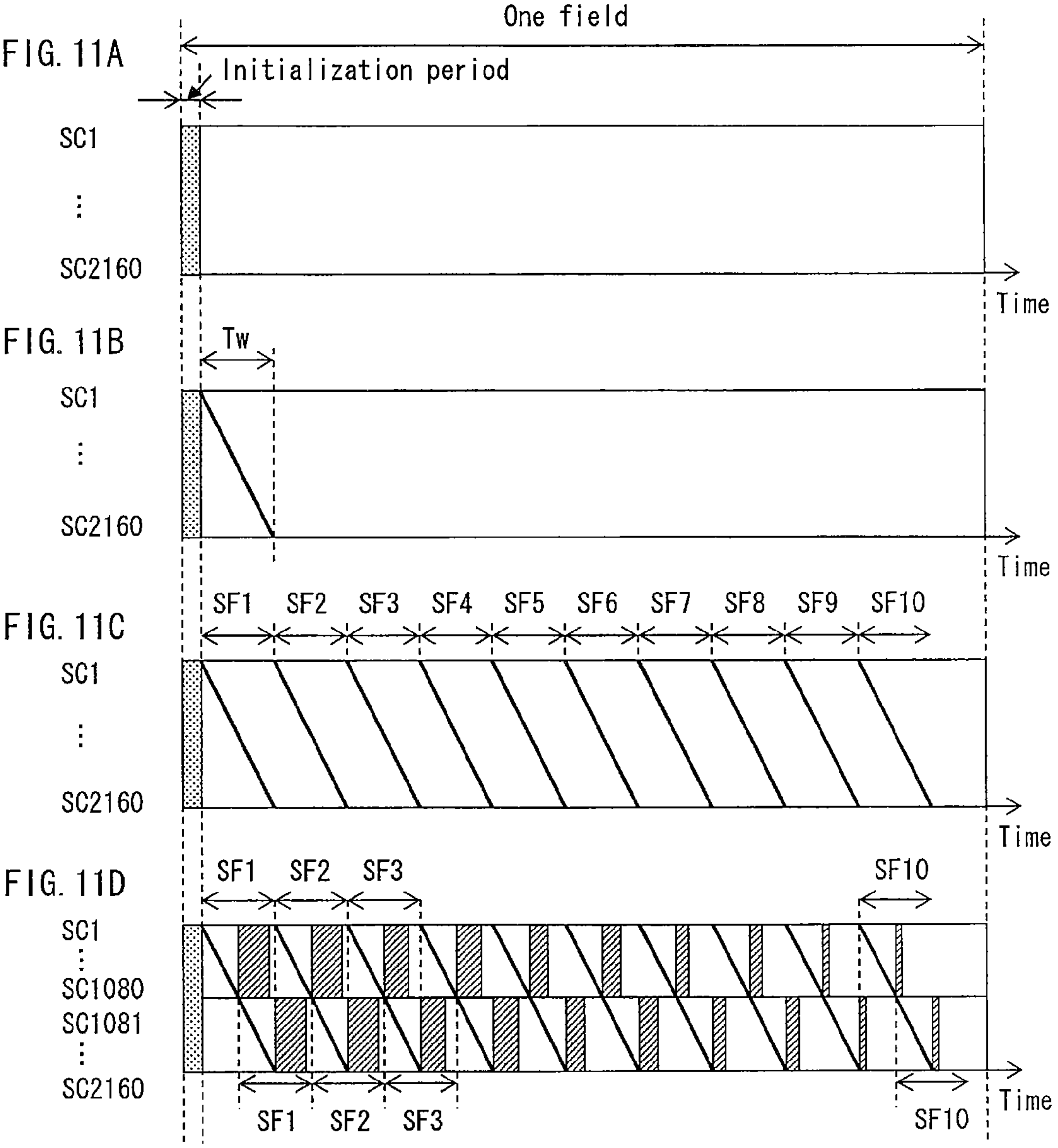
FIG. 11 describes a method of setting the structure of subfields for driving the PDP.

As shown in FIG. 11A, an initialization period, in which initialization discharge is concurrently generated in all the discharge cells, is provided at the beginning of one field period. The time required for the initialization period is assumed to be 500 μs.

Next, as shown in FIG. 11B, the time Tw required for sequentially applying a scan pulse to the scan electrodes SC1 to SC2160 is estimated. At this point, it is desirable that the scan pulse be set as short as possible and be applied as consecutively as possible so that writing operations are continuous. Assuming that the time for a writing operation is 0.7 μs for each scan electrode, then since the number of scan electrodes is 2160, the time Tw required for one writing operation over all of the scan electrodes is 0.7×2160=1512 μs.

Next, the number of subfields provided in one field is estimated. Since the time required for the erase period is negligible, the time for the initialization period is subtracted from the time for one field period, and the result is divided by the time required for performing one writing operation over all the scan electrodes, yielding a value of (16.7−0.5)/1.5=10.8. As shown in FIG. 11C, therefore, a maximum of ten subfields (SF1, SF2, SF10) can be guaranteed within one field.

Next, the number of discharge electrode pair groups is determined based on the necessary number of sustain pulses. In the present embodiment, it is assumed that sustain pulses of "60," "44," "30," "18," "11," "6," "3," "2," "1," and "1" are applied to each subfield. With a sustain pulse period of 10 μs, the maximum time Ts for applying a sustain pulse to one subfield is 10×60=600 μs.

The number N of display electrode pair groups is calculated based on the following expression, using the time Tw necessary for one writing operation over all of the scan electrodes and the maximum time Ts for applying a sustain pulse.

$$N \geqq Tw/(Tw-Ts)$$

In the present embodiment, Tw=1512 μs and Ts=600 μs. The above expression thus yields 1512/(1512−600)=1.66. Accordingly, the number N of display electrode pair groups is two.

Based on the above observations, as shown in FIG. 10, the display electrode pairs provided throughout the panel are divided into two display electrode pair groups. As shown in FIG. 11D, for each display electrode pair group, the scan electrodes belonging to the group are written to, and immediately after the writing period, a sustain period is provided to apply a sustain pulse.

It is clear that in determining the driving method of the PDP 10 and the number of display electrode pair groups, the maximum time Ts necessary for applying the sustain pulse is crucial. Modifying the above expression N≧Tw/(Tw−Ts) yields Ts≦Tw×(N−1)/N. This indicates that the length of time for the sustain period of each subfield for each display electrode pair should be set to be equal to or less than the time Ts.

In the present embodiment, N=2, Tw=1512 μs, and Ts=600 μs. Therefore, Tw×(N−1)N=756≧600, so the above condition is clearly satisfied.

The method of driving the PDP 10 and the number of display electrode pair groups can be determined as above.

After the sustain period for each subfield is complete, a subsequent erase period is provided. In FIG. 11D, both the sustain period and the erase period is shown by hatching with lines slanting from the upper right to the lower left.

Note that the erase period is not taken into consideration in the above calculation. It is preferable, however, to set writing operations not to be performed if any of the display electrode pair groups is in an erase period. This is because an erase period is not only for erasing wall voltage but also for adjusting the wall voltage on the data electrodes in preparation for the writing operation in the subsequent writing period. It is therefore preferable that the voltage of the data electrode be fixed during the erase period.

Driving Waveform for Driving PDP

Next, details are provided on the waveform of driving voltage and on operations of the PDP.

Figure 12:
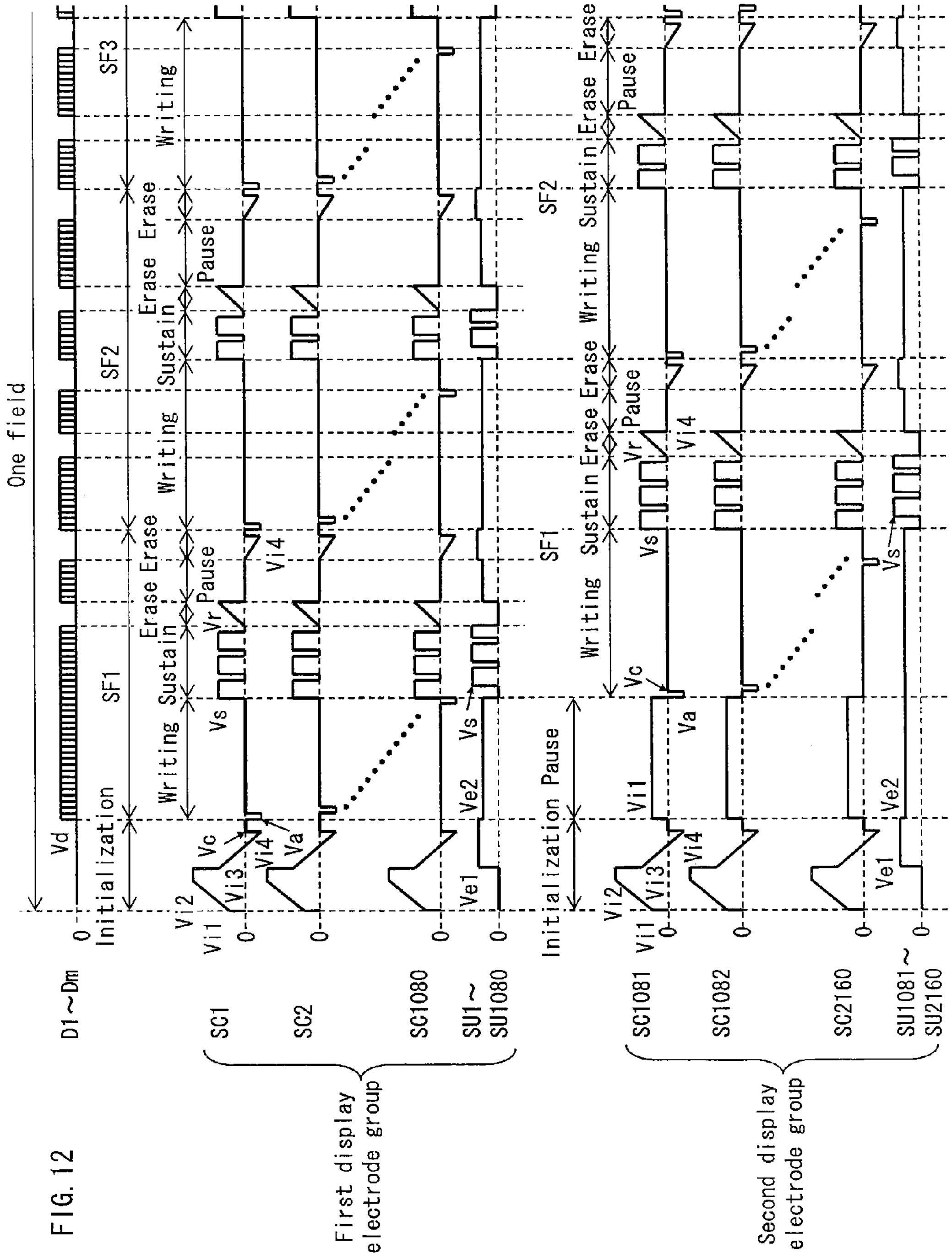
FIG. 12 shows a waveform of driving voltage applied to each electrode of the PDP.

FIG. 12 shows an example of a waveform of driving voltage applied to each electrode of the PDP 10.

In this driving method, an initialization period, in which initialization discharge is generated in all the discharge cells, is provided at the beginning of one field. Furthermore, an erase period for generating erase discharge in the discharge cells where discharge has been generated in the sustain period is provided after the sustain period of each subfield in each display electrode pair group. FIG. 12 shows an initialization period, writing periods of SF1, SF2 and SF3 with regard to the first display electrode pair group, and writing periods of SF1 and SF2 with regard to the second display electrode pair group.

Initialization Period

During the initialization period, a voltage of 0 V is applied to each of the data electrodes D1 to Dm and the sustain electrodes SU1 to SU2160, and a ramp voltage that gently rises from voltage Vi1 to voltage Vi2 is applied to the scan electrodes SC1 to SC2160. While the ramp voltage increases, a weak initialization discharge is generated between the scan electrodes SC1 to SC2160 on the one hand and the sustain electrodes SU1 to SU2160 and the data electrodes D1-Dm on the other. Subsequently, a negative wall voltage accumulates on the scan electrodes SC1 to SC2160, and a positive wall voltage accumulates on the data electrodes D1 to Dm and the sustain electrodes SU1 to SU2160 The wall voltage that accumulates on the electrodes represents the voltage generated by the wall charges accumulated on the dielectric layer, the protective layer, the phosphor layer, and the like covering the electrodes. Note that during this period, a positive voltage Vd may be applied to the data electrodes D1 to Dm.

Subsequently, a constant positive voltage Ve1 is applied to the sustain electrodes SU1 to SU2160, and a ramp voltage that gradually decreases from a voltage V13 to a voltage V14 is applied to the sustain electrodes SU1 to SU2160. In the meantime, a small initialization discharge is generated between the scan electrodes SC1 to SC2160 on the one hand and the sustain electrodes SU1 to SU2160 and the data electrodes D1 to Dm on the other. The negative wall voltage on the scan electrodes SC1 to SC2160 and the positive wall voltage on the sustain electrodes SU1 to SU2160 are then lowered, and the positive wall voltage on the data electrodes D1 to Dm is adjusted to a value appropriate for the writing operation. Subsequently, a voltage Vc is applied to the scan electrodes SC1 to SC2160. The initialization discharge is thus generated in all of the discharge cells, thereby completing initialization.

SF1 Writing Period

Next, the SF1 writing period for the first display electrode pair group is described.

A constant positive voltage Ve2 is applied to the sustain electrodes SU1 to SU1080. A scan pulse having a negative voltage Va is applied to the scan electrode SC1, and a writing pulse having a positive voltage Vd is applied to the data electrodes Dk (k=1-m) corresponding to the discharge cells in the first row that are to be caused to emit light. Consequently, the difference in the voltage at the intersection between the data electrode Dk and the scan electrode SC1 is equal to the total of the difference in the externally applied voltage (Vd−Va) and the difference between the wall voltage on the data electrode Dk and the wall voltage on the scan electrode SC1. The difference in the voltage at the intersection thus exceeds the breakdown voltage. Next, discharge is started between the data electrode Dk and the scan electrode SC1 and develops into discharge between the sustain electrode SU1 and the scan electrode SC1, thus producing the writing discharge. As a result, a positive wall voltage accumulates on the scan electrode SC1, a negative wall voltage accumulates on the sustain electrode SU1, and a negative wall voltage also accumulates on the data electrode Dk. Thus, a writing discharge is generated in the discharge cells to emit light in the first row, and the writing operation to accumulate wall voltages on each electrode is performed. On the other hand, since the voltage at the intersection between the data electrodes D1 to Dm and the scan electrode SC1, to which a writing pulse was not applied, does not exceed the breakdown voltage, a writing discharge is not generated.

Subsequently, a scan pulse is applied to the scan electrode SC2 in the second row, and a writing pulse is applied to the data electrodes Dk corresponding to the discharge cells in the second row that are to be caused to emit light. Consequently, a writing discharge is generated in the discharge cells in the second row to which the scan pulse and the writing pulse are concurrently applied, thus performing the writing operation.

The above writing operations are repeated until being performed in the discharge cells in the $1080^{th}$ row. The writing discharge is selectively generated in the discharge cells to be caused to emit light so that wall charges are formed in the selected discharge cells.

This period serves as a pause period for SF1 for the second display electrode pair group. A voltage Vi1 is applied to the scan electrodes SC1081 to SC2160 belonging to the second display electrode pair group, and a constant voltage Ve2 is applied to the sustain electrodes SU1081 to SU2160. During this pause period, reduction in the wall charge can be suppressed by maintaining the scan electrodes SC1081 to SC1081 at as high an electric potential as possible without causing discharge, so that a stable writing operation can be performed in the next writing period. The voltage applied to each electrode in the second display electrode pair group is not, however, limited to the above examples. A different voltage that does not produce discharge may be applied.

During the SF1 writing period for the second display electrode pair group, a constant positive voltage Ve2 is continually applied to the sustain electrodes SU1081 to SU2160, as during writing for the first display electrode pair group. A scan pulse is then applied to the scan electrode SC1081, and a writing pulse is applied to the data electrodes Dk corresponding to the discharge cells that are to be caused to emit light.

The above writing operations are repeated until being performed in the discharge cells in the $2160^{th}$ row. The writing discharge is selectively generated in the discharge cells to be caused to emit light so that wall charges are formed in the selected discharge cells.

SF1 Sustain Period

This period is an SF1 sustain period for the first display electrode pair group. A sustain pulse of "60" is alternately applied to the scan electrodes SC1 to SC1080 and the sustain electrodes SU1 to SU1080 belonging to the first display electrode pair group, which causes the discharge cells in which writing discharge is generated to emit light.

More specifically, a positive voltage Vs is applied to the scan electrodes SC1 to SC1080, and a voltage of 0 V is applied to the sustain electrodes SU1 to SU1080. As a consequence, a sustain pulse voltage Vs is added to the difference between the wall voltage on the scan electrode SCi and the wall voltage on the sustain electrode SUi, thus exceeding the breakdown voltage. A sustain discharge is then generated between the scan electrode SCi and the sustain electrode SUi. The ultraviolet light generated by the sustain discharge causes the phosphor layer 35 to emit light. A negative wall voltage thus accumulates on the scan electrode SCi, and a positive wall voltage accumulates on the sustain electrode SUi. A sustain discharge is not generated in the discharge cells in which a writing discharge is not generated in the writing period, and the wall voltage at the completion of the initialization period is maintained.

Subsequently, a voltage of 0 V is applied to the scan electrodes SC1 to SC1080 and a voltage Vs is applied to the sustain electrodes SU1 to SU1080. As a result, in the discharge cells where sustain discharge is generated, the difference in voltage between the sustain electrode SUi and the scan electrode SCi exceeds the starting voltage. The sustain discharge is thus generated again, negative wall voltages accumulate on the sustain electrode SUi, and positive wall voltages are accumulated on the scan electrode SCi. A sustain pulse is then similarly applied alternately to the scan electrodes SC1 to SC1080 and the sustain electrodes SU1 to SU1080, thereby providing a potential difference between the electrodes of the display electrode pair. In the discharge cells in which a writing discharge is generated in the writing period, a sustain discharge is thus continually generated, thereby causing the discharge cells to emit light.

The sustain pulse alternately applied to the pair of display electrodes is timed so that the scan electrodes SC1 to SC1080 and the sustain electrodes SU1 to SU1080 are simultaneously at high potential. In other words, when a positive voltage Vs is applied to the scan electrodes SC1 to SC1080 and a voltage of 0 V is applied to the sustain electrodes SU1 to SU1080, the voltage of the scan electrodes SC1 to SC1080 is first raised from 0 V to Vs. Subsequently, the voltage of the sustain electrodes SU1 to SU1080 is lowered from Vs to 0 V. When a voltage of 0 V is applied to the scan electrodes SC1 to SC1080 and a positive voltage Vs is applied to the sustain electrodes SU1 to SU1080, the voltage of the sustain electrodes SU1 to SU1080 is first raised from 0 V to Vs. Subsequently, the voltage of the scan electrodes SC1 to SC1080 is lowered from Vs to 0 V.

By thus applying the sustain pulses so that the scan electrodes SC1 to SC1080 and the sustain electrodes SU1 to SU1080 are both at high potential at certain times, sustain discharge can be maintained stably without being affected by writing pulses applied to the data electrodes. The reasons for this are described below.

Suppose that that the voltage of the scan electrodes SC1 to SC1080 is first lowered from Vs to 0 V, and subsequently that the voltage of the sustain electrodes SU1 to SU1080 is raised from 0 V to Vs. When a writing pulse is applied to the data electrode, discharge may occur between the scan electrode and the data electrode at the point when the voltage of the scan electrodes SC1 to SC1080 becomes low. Although the wall charge is necessary for maintaining the sustain discharge, this discharge may reduce the wall charge. Furthermore, if the voltage of the sustain electrodes SU1 to SU1080 is first lowered from Vs to 0 V, and subsequently the voltage of the scan electrodes SC1 to SC1080 is raised from 0 V to Vs, then when a writing pulse is applied to the data electrode, discharge may occur between the sustain electrode and the data electrode at the point when the voltage of the sustain electrodes SU1 to SU1080 becomes low. Although the wall charge is necessary for maintaining the sustain discharge, this discharge may reduce the wall charge.

If a discharge occurs when the voltage of one of the pair of display electrodes is low and the amount of wall charge reduces, sustain discharge may not occur when the voltage of the other electrode is raised and a sustain pulse is applied. Even if the sustain discharge does occur, it may be weak, thus preventing maintenance of the sustain discharge due to an insufficient accumulation of wall charge.

By raising the voltage of one of the pair of display electrodes and then lowering the voltage of the other electrode to apply the sustain pulse eliminates the problem of discharge occurring between one of the display electrodes and the data electrode when the writing pulse is applied to the data electrode. Therefore, regardless of whether a writing pulse is applied, the sustain discharge can be stably maintained.

Erase Period, Pause Period

Two erase periods and a pause period are provided after the sustain period. During the former erase period, a ramp voltage that rises towards the voltage Vr is applied to the scan electrodes SC1 to SC1080, and the wall voltage on the scan electrode SCi and on the sustain electrode SUi is erased, while leaving the positive wall voltage on the data electrodes Dk. A certain amount of time is necessary for such an erase operation. An erase period is not only for erasing wall voltage but also for adjusting the wall voltage on the data electrodes in preparation for the writing operation in the subsequent writing period. It is therefore preferable that the voltage of the data electrode be fixed. Accordingly, in the driving voltage waveform in the present embodiment, the writing operation for the second display electrode pair group is suspended during the erase period of the first display electrode pair group.

The subsequent period is a pause period during which no discharge occurs in the first display electrode pair group. After applying a voltage of 0 V to the scan electrodes SC1 to SC1080, a voltage Vet is applied to the sustain electrodes SU1 to SU1080. Writing operations are resumed for the second display electrode pair group, and operations for the pause period for the first display electrode pair group are continued until writing is complete for the scan electrode SC2160.

The subsequent period is a latter erase period for the first display electrode pair group. After applying a constant voltage Ve1 to the sustain electrodes SU1 to SU1080, a ramp voltage that decreases towards a voltage V14 is applied to the scan electrodes SC1 to SC1080, and the wall voltage on the data electrode is adjusted in preparation for the writing operation in the next writing period. The writing period then immediately starts, with writing operations starting with the scan electrode SC1. Beginning the writing operations immediately after applying a ramp voltage that decreases towards the voltage V14 suppresses a reduction in wall charge, thus allowing for stable writing operations during the subsequent writing period.

Driving Method from SF2 Onwards

Next, the SF2 writing period for the first display electrode pair group is described.

A constant voltage Ve2 is applied to the sustain electrodes SU1 to SU1080. While consecutively applying a scan pulse to the scan electrodes SC1 to SC1080 as in the SF1 writing period, a writing pulse is applied to the data electrodes Dk to perform the writing operation in the discharge cells in rows 1 to 1080.

Note that during the SF2 writing period for the first display electrode pair group, the second display electrode pair group is in the SF1 sustain period. In other words, a sustain pulse of “60” is alternately applied to the scan electrodes SC1081 to SC2160 and the sustain electrodes SU1081 to SU2160, thereby causing the discharge cells where the writing discharge occurs to emit light. The erase periods and pause period follow the sustain period.

Similarly, the SF2 writing period for the second display electrode pair group, the SF3 writing period for the first display electrode pair group, . . . , and the SF10 writing period for the second display electrode pair group follow. The sustain period and the erase period in SF10 for the second display electrode pair group occur last, thus completing one field.

In the present embodiment, after the initialization period, the timing of scan pulses and writing pulses is set so that writing operations are performed continuously in each of the display electrode pair groups. As a result, ten subfields can be provided within the period of one field. This number of subfields is the maximum number that can be set within the period of one field in the present embodiment.

In the present embodiment, one field is completed with a sustain period and an erase period for the second display electrode pair group. Accordingly, driving time can be reduced by providing the subfield with the least luminance weight as the last subfield.

Note that in the present embodiment, the voltage Vi1 is 150 V, the voltage Vi2 is 400 V, the voltage Vi3 is 200 V, the voltage Vi4 is −150 V, the voltage Vc is −10 V, the voltage Vb is 150 V, the voltage Va is −160 V, the voltage Vs is 200 V, the voltage Vr is 200 V, the voltage Ve1 is 140 V, the voltage Ve2 is 150 V, and the voltage Vd is 60 V. The inclination of the rising ramp voltage applied to the scan electrodes SC1 to SC2160 is 10 (V/μs), and the inclination of the falling ramp voltage is −2 (V/μs). The voltages and inclinations are not, however, limited to the above values. It is preferable for the voltages and inclinations to be set optimally based on the discharge properties of the pulse and on the specifications of the plasma display device.

Drive Circuit

The following describes an example of a drive circuit for a plasma display device that achieves the above driving waveform.

Figure 13:
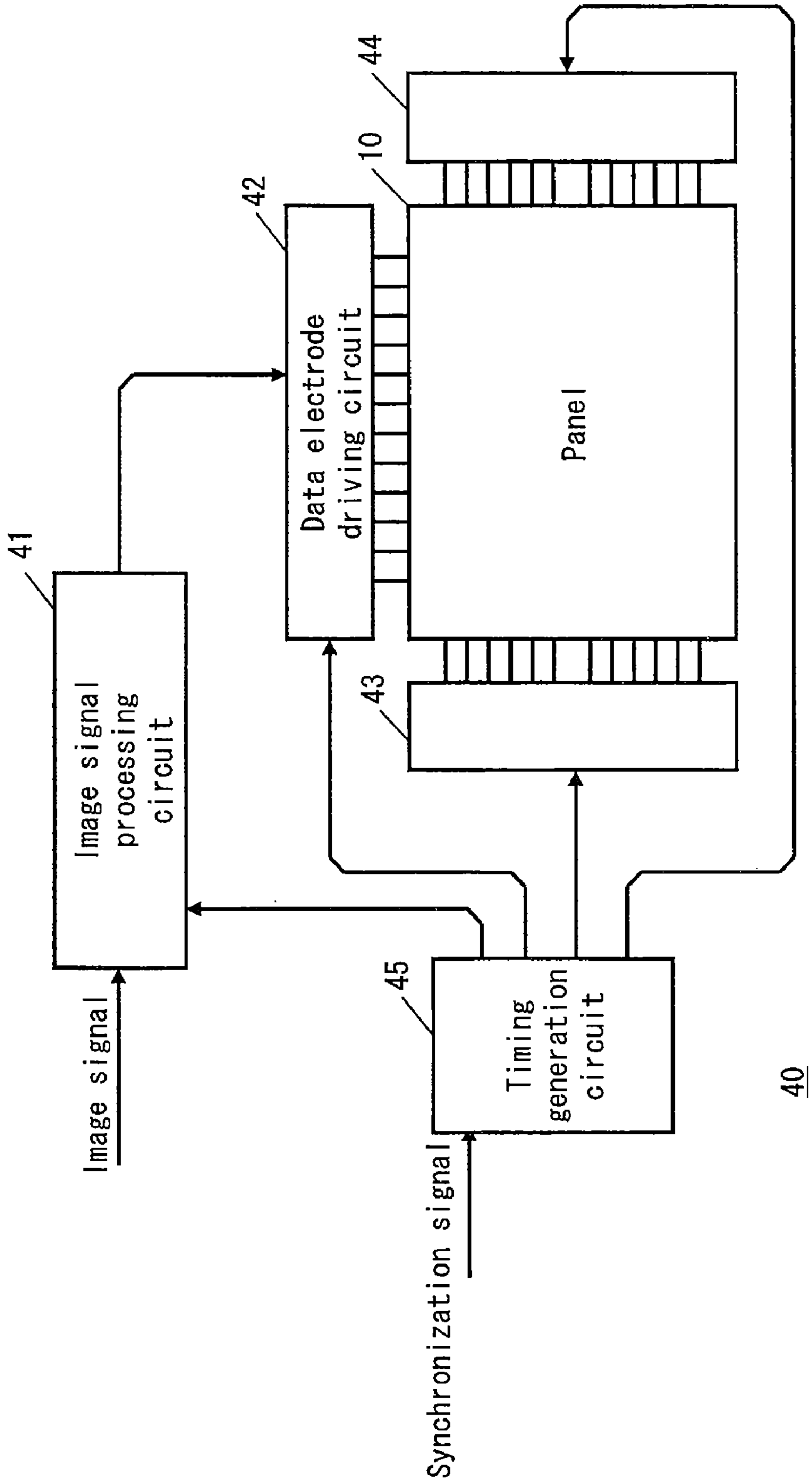
FIG. 13 is a circuit block diagram of a display device according to Embodiment 2.

FIG. 13 is a circuit block diagram of a plasma display device 40. The plasma display device 40 includes a PDP 10, an image signal processing circuit 41, a data electrode driving circuit 42, a scan electrode driving circuit 43, a sustain electrode driving circuit 44, a timing generation circuit 45, and a power supply circuit (not shown in the figures) that supplies necessary power to each circuit block.

The image signal processing circuit 41 converts an image signal to image data showing whether each subfield emits light or not. The data electrode driving circuit 42 includes m switches for applying a voltage Vd or voltage of 0 V to each of m data electrodes D1 to Dm. The data electrode driving circuit 42 converts image data outputted from the image signal processing circuit 41 into a writing pulse corresponding to the data electrodes D1 to Dm and applies the writing pulse to the data electrodes D1 to Dm.

The timing generation circuit 45 generates various types of timing signals for controlling the operations of the circuits based on a horizontal synchronization signal and a vertical synchronization signal, and supplies the timing signals to the circuits. Based on the timing signal, the scan electrode driving circuit 43 drives the scan electrodes SC1 to SC1080 belonging to the first display electrode pair group and the scan electrodes SC1081 to SC2160 belonging to the second display electrode pair group. Based on the timing signal, the sustain electrode driving circuit 44 drives the sustain electrodes SU1 to SU1080 belonging to the first display electrode pair group and the sustain electrodes SU1081 to SU2160 belonging to the second display electrode pair group.

Scan Electrode Driving Circuit 43

Figure 14:
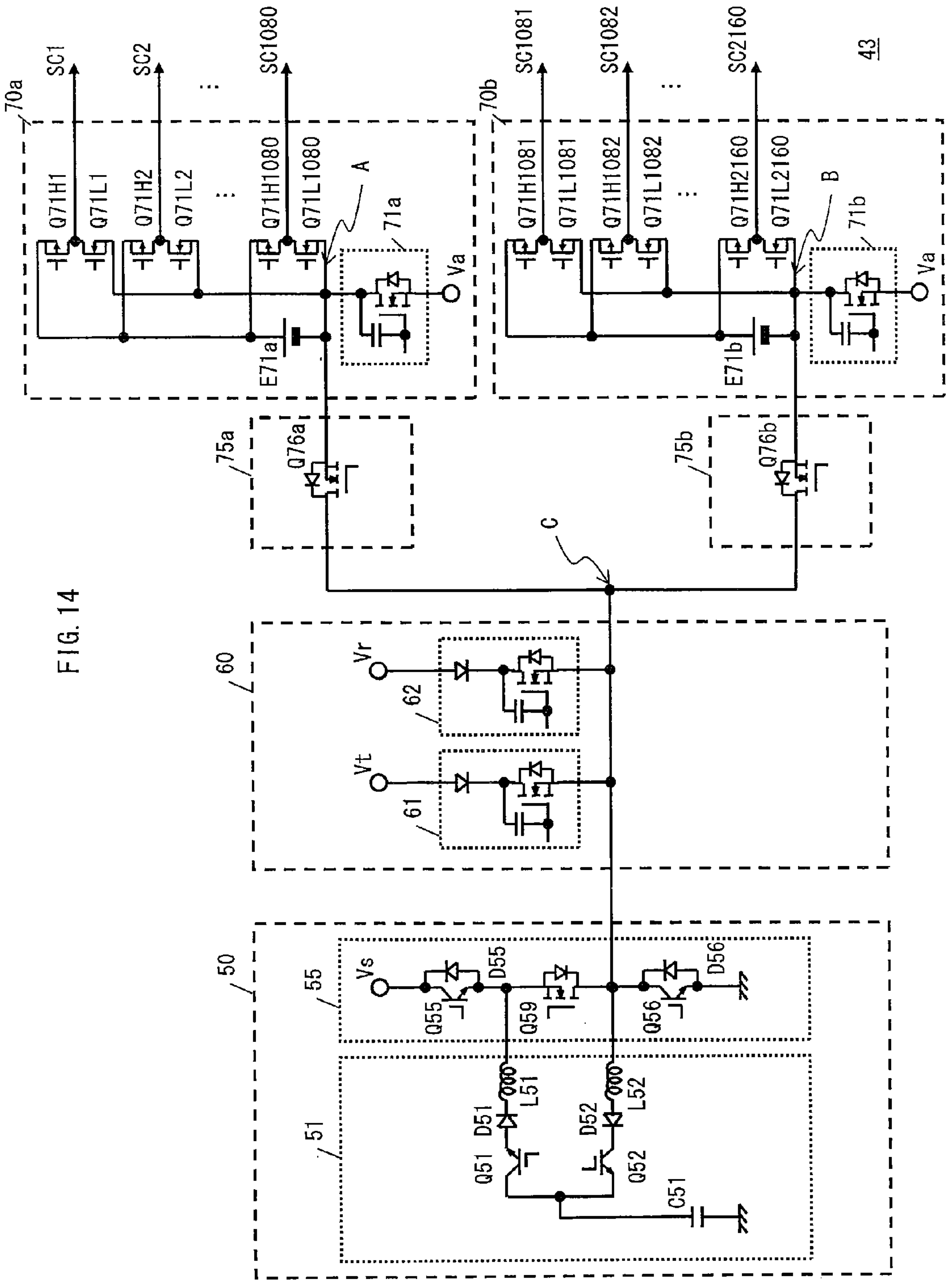
FIG. 14 is a circuit diagram of a scan electrode driving circuit in the PDP device.

FIG. 14 is a circuit diagram of the scan electrode driving circuit 43 in the plasma display device 40. The scan electrode driving circuit 43 includes a sustain pulse generator circuit 50 on the scan electrode side (hereinafter referred to simply as the "sustain pulse generator circuit 50"), a ramp generator circuit 60, a scan pulse generator circuit 70*a*, a scan pulse generator circuit 70*b*, a switch circuit 75*a* on the scan electrode side (hereinafter referred to simply as the "switch circuit 75*a*"), and a switch circuit 75*b* on the scan electrode side (hereinafter referred to simply as the "switch circuit 75*b*").

The sustain pulse generator circuit 50 includes a power recovery unit 51 and a voltage clamp unit 55 and generates the sustain pulses applied to the scan electrodes SC1 to SC1080 belonging to the first display electrode pair group and the scan electrodes SC1081 to SC2160 belonging to the second display electrode pair group.

The power recovery unit 51 includes a capacitor C51 for collecting power, switching elements Q51 and Q52, backflow preventer diodes D51 and D52, and resonance inductors L51 and L52. The power recovery unit 51 raises and lowers the sustain pulse via LC resonance between the inter-electrode capacitance of the pair of display electrodes and the inductors L51 and L52. When the sustain pulse rises, the charge accumulated in the capacitor C51 for collecting power is transferred to the inter-electrode capacitance via the switching element Q51, the diode D51, and the inductor L51. When the sustain pulse falls, the charge accumulated in the inter-electrode capacitance returns to the capacitor C51 for collecting power via the inductor L52, the diode D52, and the switching element Q52. The power recovery unit 51 thus raises and lowers the sustain pulse by LC resonance without receiving a supply of power from the power source. The power consumption is therefore close to zero. Note that the capacitor C51 for collecting power has a sufficiently large capacity compared with the inter-electrode capacitance and is charged at approximately Vs/2, i.e. half of the voltage Vs, to work as the power supply for the power recovery unit 51.

The voltage clamp unit 55 includes switching devices Q55 and Q56. By setting the switching device Q55 on, the output voltage of the sustain pulse generator circuit 50 (the voltage at the node C in FIG. 14) is clamped at voltage Vs. By setting the switching device Q56 on, the output voltage of the sustain pulse generator circuit 50 is clamped at a voltage of 0 V. This allows a stable flow of a large discharge current utilizing the sustain discharge, while reducing impedance during voltage application by the voltage clamp unit 550.

Thus, the sustain pulse generator circuit 50 generates a sustain pulse by controlling the switching devices Q51, Q52, Q55, and Q56. While these switching devices may be made with use of well-known devices such as MOSFETs or IGBTs, the circuit structure shown in FIG. 14 uses IGBTs for the switching devices. When IGBTs are used as the switching devices Q55 and Q56, it is necessary to secure a current path extending in an opposite direction to the current that is controlled. Accordingly, as shown in FIG. 14, the diode D55 is connected in parallel with the switching device Q55, and the diode D56 is connected in parallel with the switching device Q56. Although not shown in FIG. 14, a diode may be connected in parallel with each of the switching device Q51 and the switching device Q52 for the purpose of protection of the IGBTs.

A switching device Q59 is a separation switch provided for preventing a current from flowing back from the ramp generator circuit 60, which is described below, towards the voltage Vs via the diode D55 when the voltage level at the node C is increased to a higher value than Vs, for example Vi2, in an initialization period.

The ramp generator circuit 60 includes two mirror integration circuits 61 and 62. The mirror integration circuit 61 causes the output voltage from the ramp generator circuit 60 (i.e. a voltage level at node C of FIG. 13) to increase with a gentle slope to voltage Vt. The mirror integration circuit 62 causes the output voltage from the ramp generator circuit 60 to increase with a gentle slope to voltage Vr.

The scan pulse generator circuit 70*a* includes a power source E71*a* of voltage Vp, a mirror integration circuit 71*a*, switching devices Q71H1 to Q71H1080, and switching devices Q71L1 to Q71L1080. The mirror integration circuit 71*a* causes a lower-side voltage of the power source E71*a* (i.e. a voltage level at a node A of FIG. 14) to decrease with a gentle slope to voltage Va. The mirror integration circuit 71*a* also clamps the lower-side voltage of the power source E71*a* to the voltage Va. Each of the switching devices Q71L1 to Q71L1080 applies the lower-side voltage of the power source E71*a* to a corresponding one of the scan electrodes. Each of the switching devices Q71H1 to Q71H1080 applies a higher-side voltage of the power source E71*a* to a corresponding one of the scan electrodes.

The scan pulse generator circuit 70*b* has a similar configuration to the scan pulse generator circuit 70*a*, and includes a power source E71*b* of the voltage Vp, a mirror integration circuit 71*b*, switching devices Q71H1081 to Q71H2160, and switching devices Q71L1081 to Q71L2160. The scan pulse generator circuit 70*b* also applies a higher-side voltage or a lower-side voltage of the power source E71*b* to the scan electrodes SC1081 to SC2160 belonging to the second display electrode pair group.

The switch circuit 75*a* includes a switching device Q76*a* and electrically connects or separates the sustain pulse generator circuit 50 and the ramp generator circuit 60 to/from the scan pulse generator circuit 70*a*. The switch circuit 75*b* includes a switching device Q76*b*, and electrically connects or separates the sustain pulse generator circuit 50 and the ramp generator circuit 60 to/from the scan pulse generator circuit 70*b*.

Using the above-described scan electrode driving circuit 43 allows for application of drive waveforms shown in FIG. 12 to the scan electrodes SC1 to SC1080 belonging to the first display electrode pair group and the scan electrodes SC 1081 to SC 2160 belonging to the second display electrode pair group.

The following describes details on the operations of the scan electrode driving circuit 43.

During the initialization period, in the switch circuit 75*a* and the switch circuit 75*b*, the switching devices Q76*a* and Q76*b* are on, whereas in the scan pulse generator circuits 70*a* and 70*b*, the switching devices Q71H1 to Q71H2160 are on, and the switching devices Q71L1 to Q71L2160 are off. Voltage obtained by adding the voltage Vp to an output from the ramp generator circuit 60 is thus applied simultaneously to the scan electrodes SC1 to SC2160. Subsequently, in the switch circuit 75*b*, the switching devices Q76*a* and Q76*b* are turned off, whereas in the scan pulse generator circuits 70*a* and 70*b*, the switching devices Q71H1 to Q71H2160 are turned off, and the switching devices Q71L1 to Q71L2160 are turned on. The minor integration circuits 71*a* and 71*b* are then turned on. Ramp voltage falling to voltage V14 is thus applied simultaneously to the scan electrodes SC1 to SC2160. Subsequently, the switching devices Q71L1 to Q71L2160 are turned off, and the switching devices Q71H1 to Q71H2160 are turned on, so that voltage Vc is applied simultaneously to the scan electrodes SC1 to SC2160.

During a writing period of the first display electrode pair group, the switching device Q76*a* included in the switch circuit 75*a* is off, and the mirror integration circuit 71*a* is on. At the same time, each of switching devices Q71Hn and Q71Ln is turned on and off. Scan pulses are thus applied to the corresponding scan electrodes SCn. The above method is also applied to a writing period of the second display electrode pair group, so that scan pulses are applied to the corresponding scan electrodes SCn.

During a sustain period of the first display electrode pair group, in the switch circuit 75*a*, the switching device Q76*a* is on, whereas in the scan pulse generator circuit 70*a*, the switching devices Q71H1 to Q71H1080 are off, and the switching devices Q71L1 to Q71L1080 are on. Output from the sustain pulse generator circuit 50 is thus applied to the first display electrode pair group of switching devices SC1 to SC1080. During the sustain period of the first display electrode pair group, the second display electrode pair group is in a writing period. Accordingly, the switching device Q76*b* included in the switch circuit 75*b* is off. Therefore, output from the sustain pulse generator circuit 50 does not have any effect on the scan electrodes SC1081 to SC2160 belonging to the second display electrode pair group. This means that the above-described writing action can be performed with respect to the scan electrodes SC1081 to SC2160 belonging to the second display electrode pair group independently of output from the sustain pulse generator circuit 50. Similarly, when the second display electrode pair group is in a sustain period and the first display electrode pair group is in a writing period, the switching device Q76*a* included in the switch circuit 75*a* is off. Therefore, output from the sustain pulse generator circuit 500 does not have any effect on the scan electrodes SC1 to SC1080 belonging to the first display electrode pair group.

During the subsequent first half of an erase period of the first display electrode pair group, in the switch circuit 75*a*, the switching device Q76*a* is on, whereas in the scan pulse generator circuit 700*a*, the switching devices Q71H1 to Q71H1080 are off, and the switching devices Q71L1 to Q71L1080 are on. Output from the ramp generator circuit 600 is thus applied to the scan electrodes SC1 to SC1080. During the first half of the erase period of the first display electrode pair group, the second display electrode pair group is in a writing period (more precisely, the writing action is interrupted), and the switching device Q76*b* in the switch circuit 75*b* is off. Accordingly, output voltage from the ramp generator circuit 60 does not have any effect on the scan electrodes SC1081 to SC2160 belonging to the second display electrode pair group. The same applies to the subsequent pause period and the latter half of the erase period. Since the switching device Q76*b* is off, output voltage from the ramp generator circuit 60 does not have any effect on the scan electrodes SC1081 to SC2160 belonging to the second display electrode pair group.

Thus turning off the switch circuits 75*a* and 75*b* during the periods when falling ramp voltage is applied and in the writing period allows the scan electrode driving circuit 43 to apply a desired voltage to one of the display electrode pair groups without any effect by voltage applied to the other display electrode pair group.

Sustain Electrode Driving Circuit 44

Figure 15:
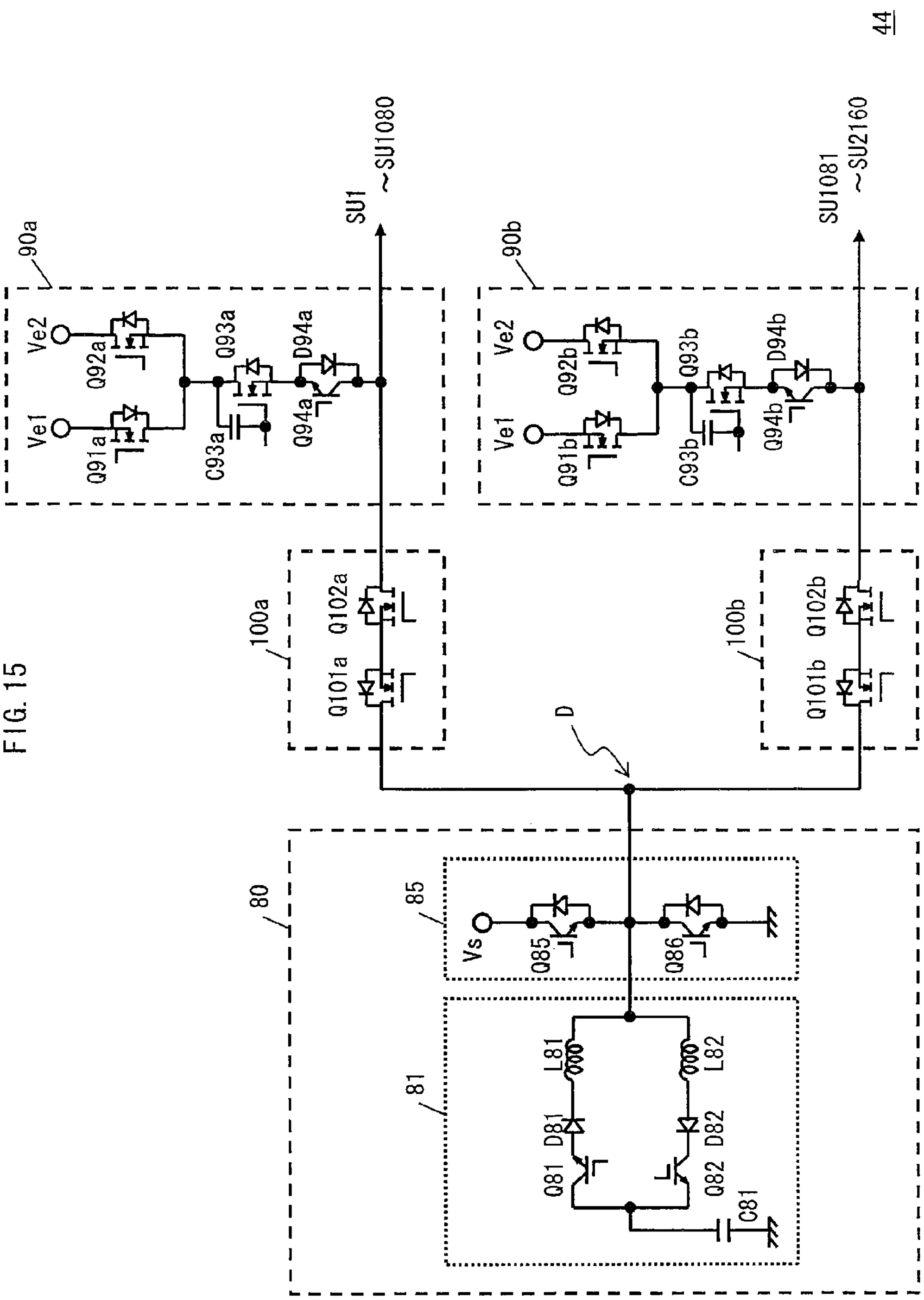
FIG. 15 is a circuit diagram of a sustain electrode driving circuit in the PDP device.

FIG. 15 is a circuit diagram of the sustain electrode driving circuit 44 in the plasma display device 40. The sustain electrode driving circuit 44 includes a sustain pulse generator circuit 80 on the sustain electrode side (hereinafter referred to simply as the "sustain pulse generator circuit 80"), a fixed voltage generator circuit 90*a*, a fixed voltage generator circuit 90*b*, a switch circuit 100*a* on the sustain electrode side (hereinafter referred to simply as the "switch circuit 100*a*"), and a switch circuit 100*b* on the sustain electrode side (hereinafter referred to simply as the "switch circuit 100*b*").

The sustain pulse generator circuit 80 includes a power recovery unit 81 and a voltage clamp unit 85 and generates sustain pulses to be applied to the sustain electrodes SU 1 to SU 1080 belonging to the first display electrode pair group and the sustain electrodes SU 1081 to SU 2160 belonging to the second display electrode pair group.

The power recovery unit 81 includes a capacitor C81 for collecting power, switching elements Q81 and Q82, backflow preventer diodes D81 and D82, and resonance inductors L81 and L82. Like the power recovery unit 51, the power recovery unit 81 raises and lowers the sustain pulse via LC resonance between the inter-electrode capacitance of the pair of display electrodes and the inductors L81 and L82.

The voltage clamp unit 85 includes switching devices Q85 and Q86, and like the voltage clamp unit 55, clamps an output voltage from the sustain pulse generator circuit 80 (i.e. a voltage level at a node D of FIG. 14) to the voltage Vs or a voltage of 0 V.

The fixed voltage generator circuit 90*a* includes switching devices Q91*a*, Q92*a*, Q93*a*, and Q94*a*. The switching device Q93*a* and the switching device Q94*a* are connected in series to form a bi-directional switch such that the devices Q93*a* and Q94*a* control currents flowing in opposite directions. To the sustain electrodes SU1 to SU1080 belonging to the first display electrode pair group, a fixed voltage Ve1 is applied via the switching devices Q91*a*, Q93*a*, and Q94*a*, and a fixed voltage Ve2 is applied via the switching devices Q92*a*, Q93*a*, and Q94*a*.

The fixed voltage generator circuit 90*b* has a similar structure to the fixed voltage generator circuit 90*a*, and includes switching devices Q91*b*, Q92*b*, Q93*b*, and Q94*b*. The fixed voltage generator circuit 90*b* applies the fixed voltage Ve1 or the fixed voltage Ve2 to the sustain electrodes SU 1081 to SU 2160 belonging to the second display electrode pair group.

While these switching devices may also be made with use of well-known devices such as MOSFETs or IGBTs, the circuit structure shown in FIG. 15 uses IGBTs for the switching devices. IGBTs are used as the switching devices Q94*a* and Q94*b*. In order to secure a current path extending in an opposite direction to a current that is controlled, a diode D94*a* is connected in parallel with the switching device Q94*a*, and a diode D94*b* is connected in parallel with the switching device Q94*b*.

The switching device Q94*a* is provided for supplying a current in a direction from the sustain electrodes SU1 to SU1080 towards the power source of voltages Ve1 and Ve2. The switching device Q94*a* may be omitted in a case where a current is supplied only from the power source of voltages Ve1 and Ve2 towards the sustain electrodes SU1 to SU1080. The same applies to the switching device Q94*b*.

Furthermore, a capacitor C93*a* is connected between the gate and the drain of the switching device Q93*a*, and a capacitor C93*b* is connected between the gate and the drain of the switching device Q93*b*. The capacitors C93*a* and C93*b* are provided merely for smoothing a rising edge of a voltage waveform at the time of application of voltages Ve1 and Ve2 and are not essential components. In particular, when voltages Ve1 and Ve2 are varied step by step, the capacitors C93*a* and C93*b* are not required.

The switch circuit 100*a* includes switching devices Q101*a* and Q102*a* that are connected in series to form a bi-directional switch such that the devices Q101*a* and Q102*a* control currents flowing in opposite directions. The switch circuit 100*a* electrically connects or separates the sustain pulse generator circuit 80 to/from the sustain electrodes SU1 to SU1080 belonging to the first display electrode pair group.

The switch circuit 100*b* includes switching devices Q101*b* and Q102*b* that are connected in series to form a bi-directional switch such that the devices Q101*b* and Q102*b* control currents flowing in opposite directions. The switch circuit 100*b* electrically connects or separates the sustain pulse generator circuit 80 to/from the sustain electrodes SU1081 to SU2160 belonging to the second display electrode pair group.

Using the above-described sustain electrode driving circuit 44 allows for application of the drive waveforms shown in FIG. 12 to the sustain electrodes SU1 to SU1080 belonging to the first display electrode pair group and the sustain electrodes SU1081 to SU2160 belonging to the second display electrode pair group.

The following describes details on the operations of the sustain electrode driving circuit 44.

When the rising ramp waveform is applied to the scan electrodes SC1 to SC2160 during the initialization period, in the switch circuits 100*a* and 100*b*, the switching devices Q101*a*, Q102*a*, Q101*b*, and Q102*b* are on, and an output from the sustain pulse generator circuit 80 is set to 0 V. A voltage of 0 V is thus applied simultaneously to the sustain electrodes SU1 to SU2160. During the latter half of the initialization period when the falling ramp waveform is applied to the scan electrodes SC1 to SC2160, in the switch circuits 100*a* and 100*b*, the switching devices Q101*a*, Q101*b*, Q102*a*, and Q102*b* are off, whereas in the fixed voltage generator circuit 90*a* and 90*b*, the switching devices Q91*a*, Q91*b*, Q93*a*, Q93*b*, Q94*a*, and Q94*b* are on. The voltage Ve1 is thus applied simultaneously to the sustain electrodes SU1 to SU2160.

In the writing period, the switching devices Q91*a* and Q91*b* are off, and the switching devices Q92*a* and Q92*b* are on, so that the voltage Ve2 is output.

During the sustain period of the first display electrode pair group, in the switch circuit 100*a*, the switching devices Q101*a* and Q102*a* are on, whereas in the fixed voltage generator circuit 90*a*, the switching devices Q930*a* and Q940*a* are off. The sustain pulse output from the sustain pulse generator circuit 80 is thus applied to the sustain electrodes SU1 to SU1080. During the sustain period of the first display electrode pair group, the second display electrode pair group is in the writing period. However, the switching devices Q101*b* and Q102*b* included in the switch circuit 100*b* are off. Therefore, output from the sustain pulse generator circuit 800 does not have any effect on the sustain electrodes SU1081 to SU2160. The same applies to when the second display electrode pair group is in a sustain period and the first display electrode pair group is in a writing period, too. In other words, the switching devices Q101*b* and Q102*b* included in the switch circuit 100*b* are on, whereas the switching devices Q93*b* and Q94*b* included in the fixed voltage generator circuit 90*b* are off. A sustain pulse output from the sustain pulse generator circuit 80 is thus applied to the sustain electrodes SU1081 to SU2160. During the sustain period of the second display electrode pair group, the first display electrode pair group is in a writing period. However, the switching devices Q101*a* and Q102*a* included in the switch circuit 100*a* are off. Therefore, output from the sustain pulse generator circuit 80 does not have any effect on the sustain electrodes SU1 to SU1080.

During the subsequent erase period of the sustain electrodes SU1 to SU1080 belonging to the first display electrode pair group, a voltage of 0 V is output from the sustain pulse generator circuit 80. During the following pause period, the switching devices Q101*a* and Q102*a* included in the switch circuit 100*a* are turned off, and the switching devices Q91*a*, Q93*a*, and Q94*a* included in the fixed voltage 90*a* are turned on, so that the voltage Ve1 is applied to the sustain electrodes SU1 to SU1080. During the following latter half of the erase period, in the fixed voltage generator circuit 90*a*, the switching device Q91*a* is turned off, and the switching device Q92*a* is turned on. The voltage Ve2 is thus applied to the sustain electrodes SU1 to SU1080. During the above-mentioned first half of the erase period, the pause period, and the latter half of the erase period also, the sustain electrodes SU1081 to SU2160 belonging to the second display electrode pair group are not affected at all. Similarly, when the sustain electrodes SU1081 to SU2160 belonging to the second display electrode pair group are in an erase period and a pause period, and the sustain electrodes SU1 to SU1080 belonging to the first display electrode pair group are in a writing period, voltage applied to the sustain electrodes SU1081 to SU2160 does not affect the sustain electrodes SU1 to SU1080 at all.

Thus turning off the switch circuits 100*a* and 100*b* during a writing period allows the sustain electrode driving circuit 44 to apply a desired voltage to one of the display electrode pair groups without any effect by voltage applied to the other display electrode pair group.

Advantageous Effects of PDP Display Device of Present Embodiment

In the above described display device according to the present embodiment, the PDP 10 is high-definition and has a narrow cell pitch. As described in Embodiment 1, setting the composition of the discharge gas and each partial pressure therein allows for efficient luminous display.

On the other hand, in high-definition PDPs, the time necessary for writing in each subfield generally increases. This makes it difficult to guarantee sufficient time for the discharge sustain period when using a driving method that generates a sustain discharge in all of the discharge cells after writing to all of the discharge cells in each subfield, as in Embodiment 1. In particular, experiments by the inventors revealed that when helium is included in the discharge gas, the discharge delay (discharge statistical delay time ts, discharge formation delay time tf) grows large, thereby increasing the length of the writing period. This makes it difficult to guarantee a long discharge sustain time and to obtain adequate emission luminance.

The present embodiment, on the other hand, adopts pure wave driving, thus lengthening the discharge sustain period that can be guaranteed for one field and improving emission luminance.

The display device of the present embodiment thus compensates for the decrease in emission luminance in high-definition PDPs via a driving method that offers improved luminance, thereby achieving a high-definition display device with high luminous efficiency and brightness.

Variations on the Driving Method

In the driving method shown in FIG. 11, an example of subfield structure has been described in which the phases of the subfields in the first display electrode pair group and in the second display electrode pair group are offset from each other in all of the subfields, but the subfield structure is not limited in this way. For example, the subfield structure may contain several subfields according to a writing/sustain separation method that uses a uniform phase in the sustain period for all the discharge cells.

Specific circuit configurations for the sustain pulse generator circuit, the ramp generator circuit, and the like are only examples. Any other circuit configuration that similarly generates a driving voltage waveform may be used.

For example, the power recovery unit 51 shown in FIG. 14 is configured to transfer, at a rising edge of the sustain pulse, the charge accumulated in the capacitor C51 to the inter-electrode capacitance via the switching device Q51, the diode D51, the inductor L51, and the switching device Q59, and to return, at a falling edge of the sustain pulse, the charge accumulated in the inter-electrode capacitance to the capacitor C51 via the inductor L52, the diode D52, and the switching device Q52. However, the inductor L51 may be connected at one terminal to the node C instead of the source of the switching device Q59. In this circuit configuration, at a rising edge of the sustain pulse, the charge accumulated in the capacitor C51 is transferred to the inter-electrode capacitance via the switching device Q51, the diode D51, and the inductor L51. Alternatively, a circuit configuration in which only one inductor doubles as the inductor L51 and the inductor L52 may be adopted.

Furthermore, although the ramp generator circuit 60 shown in FIG. 14 includes two mirror integration circuits 61 and 62, a circuit configuration in which the ramp generator circuit 60 includes one voltage switch circuit and one mirror integration circuit may be adopted.

The capacitor C51 included in the power recovery unit 51 shown in FIG. 14 and the whole power recovery unit 81 shown in FIG. 15 may be omitted. In this case, the node D of FIG. 15 would be connected to connection points of the switching devices Q51 and Q52 of FIG. 14. Alternatively, a circuit configuration may be adopted wherein the whole power recovery unit 51 shown in FIG. 14 and the capacitor C81 included in the power recovery unit 81 shown in FIG. 15 are omitted. In this case, the node C would be connected to connection points of the switching devices Q81 and Q82 of FIG. 15.

Use of Dual Scan

An example has been described in which the number of pairs of display electrodes in FIG. 10 is 2160, and the display electrode pairs are divided into two groups. As in the PDP 101 shown in FIG. 16, however, the number of the display electrode pairs may be 4320. In this panel configuration, the data electrodes D1 to Dm are configured to intersect with the scan electrodes SC1 to SC2160 and the sustain electrodes SU1 to SU2160. Other data electrodes Dm+1 to D2*m* may also be configured to intersect with scan electrodes SC2161 to SC4320 and sustain electrodes SU2161 to SU4320. Dual scan may be adopted to drive this PDP as well by a similar method as described above.

In other words, the 4320 pairs of display electrodes provided in the PDP 101 may be divided into an upper half and a lower half.

In the upper half, the first display electrode pair group is formed by the scan electrodes SC1 to SC1080 and the sustain electrodes SU1 to SU1080, whereas the second display electrode pair group is formed by the scan electrodes SC1081 to SC2160 and the sustain electrode SU1081 to SU2160. The data electrodes D1 to Dm intersect with these first and second display electrode pair groups.

On the other hand, in the lower half, the first display electrode pair group is formed by the scan electrodes SC2161 to SC3240 and the sustain electrodes SU2161 to SU3240, whereas the second display electrode pair group is formed by the scan electrodes SC3241 to SC4320 and the sustain electrode SU3241 to SU4320. The data electrodes Dm+1 to D2*m* intersect with these first and second display electrode pair groups.

The data electrodes D1 to Dm intersect only with the display electrode pair groups composed of the scan electrodes SC1 to SC2160 and the sustain electrodes SU1 to SU2160 in the upper half Therefore, the data electrodes D1 to Dm are not affected at all by any operation performed by the scan electrodes SC2161 to SC4320 and the sustain electrodes SU2161 to SU4320.

Similarly, the data electrodes Dm+1 to D2*m* only intersect with the display electrode pair groups in the lower half and therefore are not affected at all by the scan electrodes SC1 to SC2160 and the sustain electrodes SU1 to SU2160.

Figure 16:
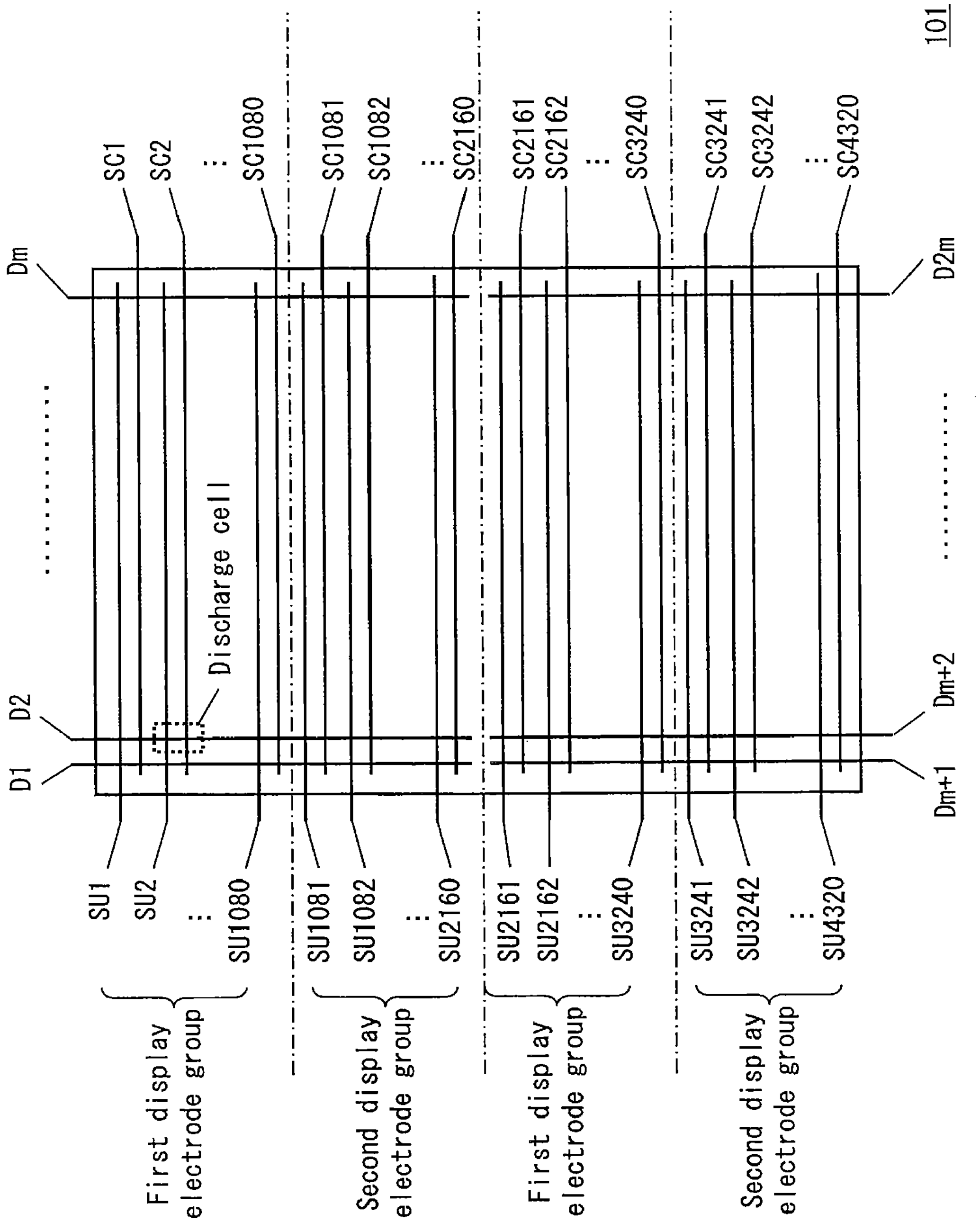
FIG. 16 is a view showing electrode layout in the panel of another PDP device according to Embodiment 2.

In this way, in the PDP 101 shown in FIG. 16, while the number of display electrode pairs is twice the number shown in FIG. 10, independent operations are possible in the upper and lower regions. Operations similar to those described above may thus be performed in parallel.

Figure 17:
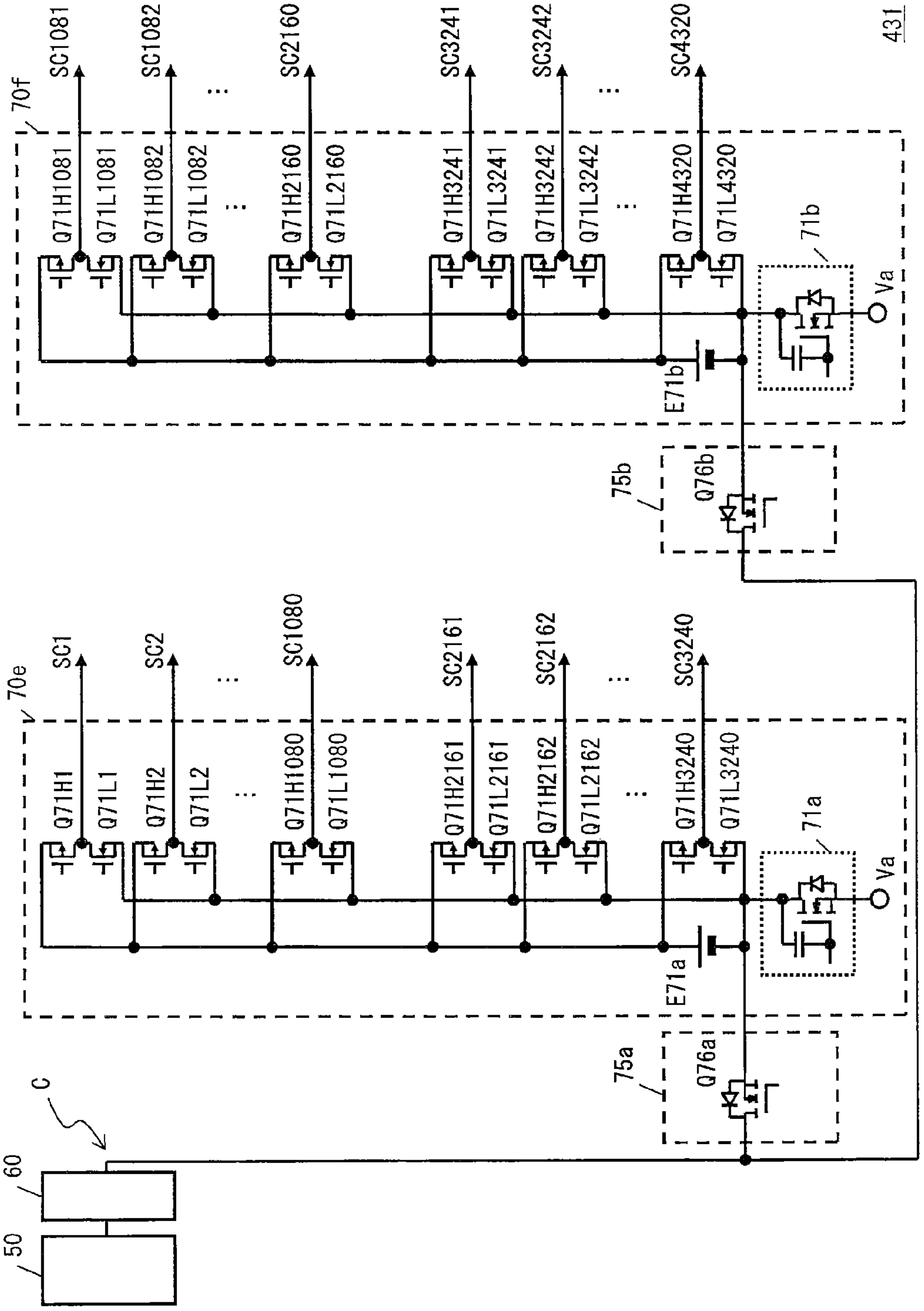
FIG. 17 is a circuit diagram of a scan electrode driving circuit in the PDP device.

FIG. 17 is a circuit diagram of a scan electrode driving circuit 431 for driving the scan electrodes included in the panel shown in FIG. 16. The scan electrode driving circuit 431 differs from the scan electrode driving circuit 43 in the following two points. First, compared with the scan pulse generator circuit 70*a*, a scan pulse generator circuit 70*e* additionally includes switching devices Q71H2161 to Q71H3240 and Q71L2161 to Q71L3240 provided for driving the scan electrodes SC2161 to SC3240. Second, compared with the scan pulse generator circuit 70*b*, a scan pulse generator circuit 70*f* additionally includes switching devices Q71H3241 to Q71H4320 and Q71L3241 to Q71L4320 provided for driving the scan electrodes SC3241 to SC4320. The scan pulse generator circuit 50 and the ramp generator circuit 60 have similar configurations.

Using the above-described scan electrode drive circuit enables a writing pulse to be applied to the scan electrode SC2161 simultaneously with application of a writing pulse to the scan electrode SC1 in a writing period of the first display electrode pair group. Similarly, in a writing period of the second display electrode pair group, a writing pulse is applied to the scan electrode SC3241 simultaneously with application of a writing pulse to the scan electrode SC1081. As a result, writing actions are performed simultaneously both in the upper display area and in the lower display area in the PDP 101, so that the PDP 101 can display images via the same drive waveform as the operations when n=2160.

While not shown in the figures, the sustain electrode driving circuit would have a similar configuration. Specifically, the sustain electrodes SU2161 to SU3240 would be additionally connected to the sustain electrode drive circuit connected to the sustain electrodes SU1 to SU1080, and the sustain electrodes SU3241 to SU4320 would be additionally connected to the circuit connected to the sustain electrodes SU1081 to SU2160.

Example of Division into Four Display Electrode Pair Groups

While in the above example, the number N of display electrode pair groups is two, this number may be set larger.

Figure 18:
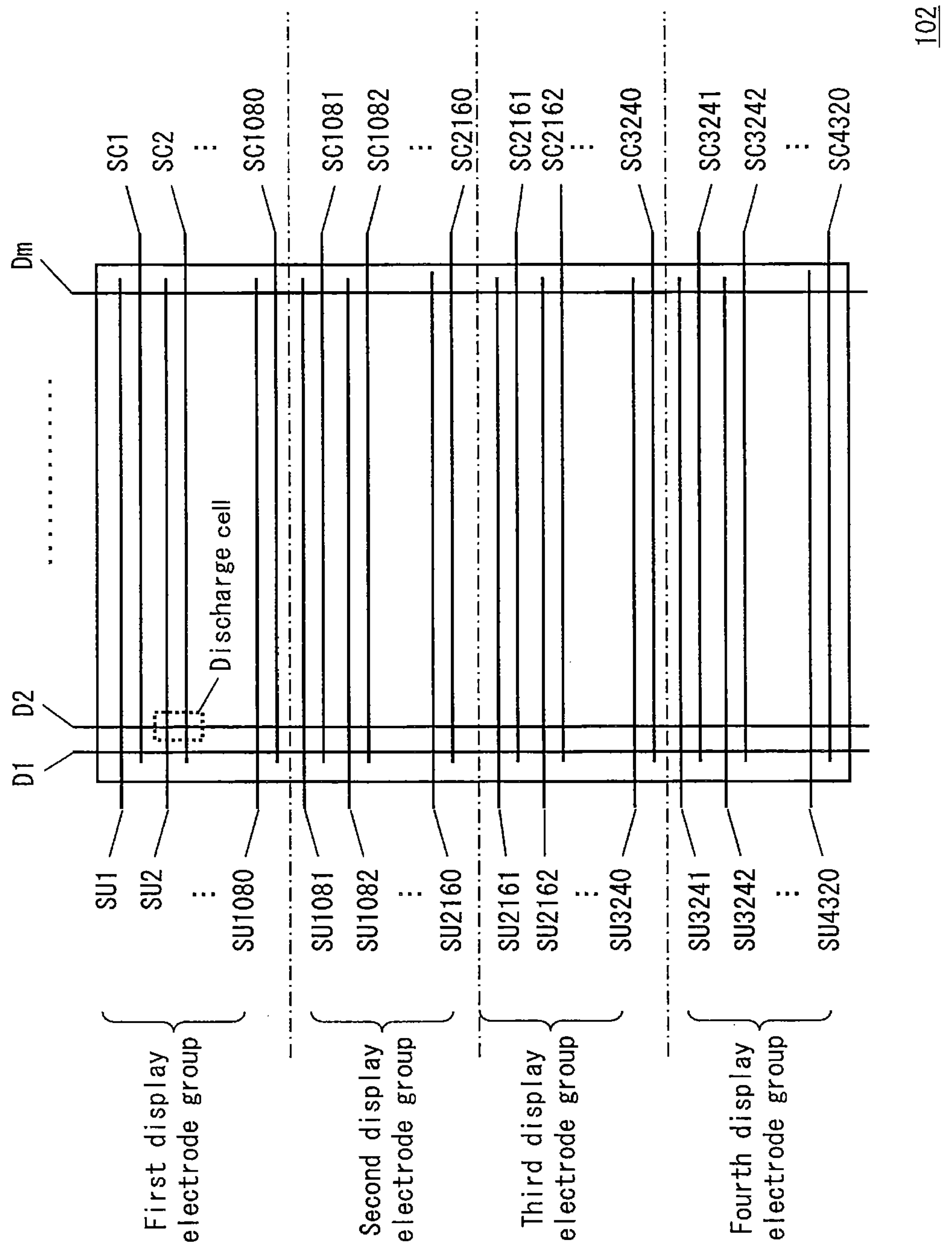
FIG. 18 is a view showing electrode layout in the panel of another PDP device according to Embodiment 2.

FIG. 18 shows an arrangement of electrodes in a PDP 102. In the PDP 102, the number of display electrode pairs is 4320, which are divided into four display electrode pair groups. Furthermore, m data electrodes are provided so as to intersect all of the display electrode pairs. In the PDP 10, the number N of groups of display electrode pairs is two, whereas this number is increased to four in the present example. The value of Tw×(N−1)/N thus increases.

In the PDP 102, unlike the PDP 101, writing operations cannot be performed in the upper half and the lower half of the panel simultaneously. Since the number N of groups of display electrode pairs is large, however, the maximum time Ts allotted for the sustain period may be set to a larger value.

Accordingly, the emission luminance can be increased by increasing the number of sustain pulses applied to the display electrode pairs during the sustain period.

Figure 19:
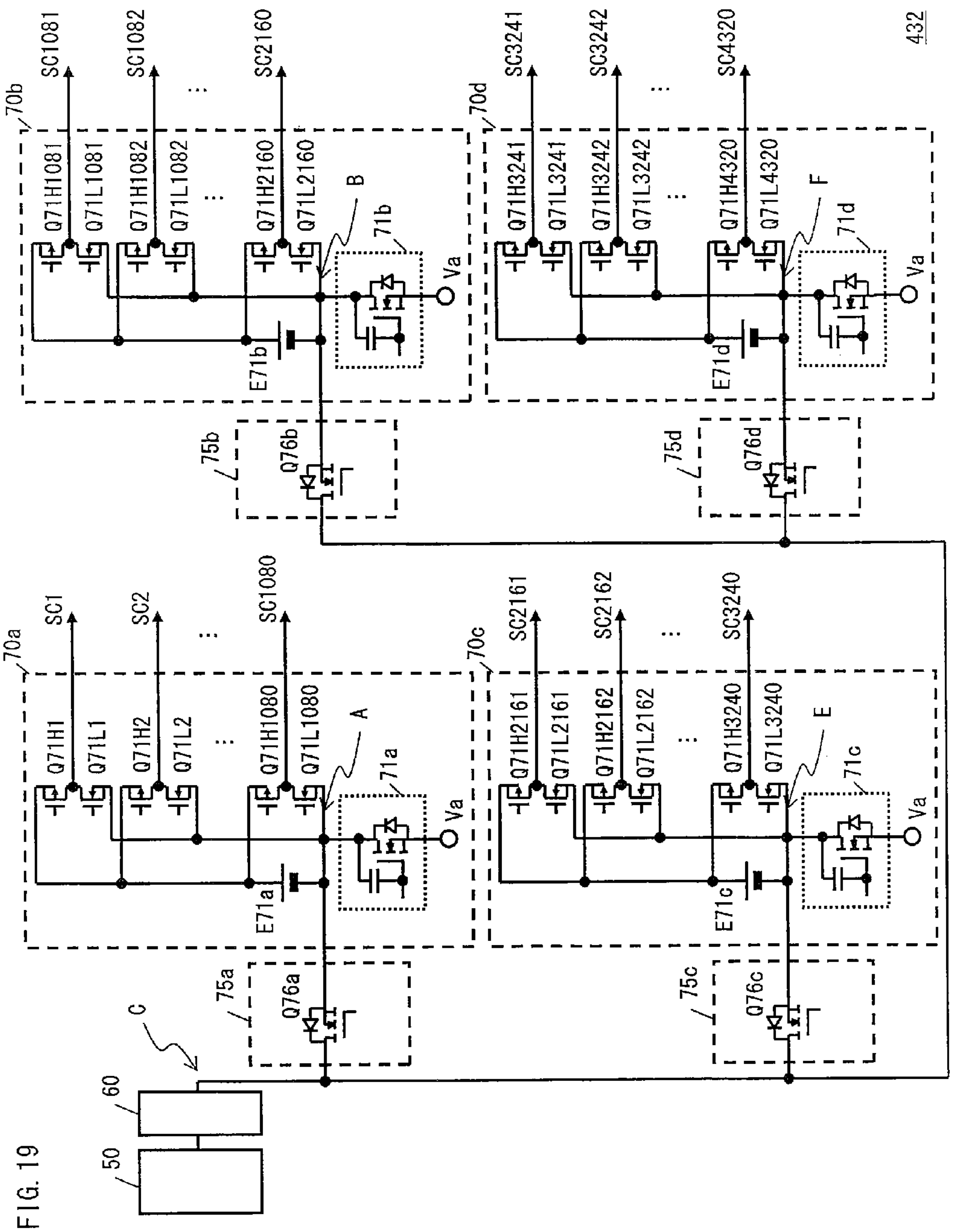
FIG. 19 is a circuit diagram of a scan electrode driving circuit in the PDP device.

FIG. 19 is a circuit diagram of a scan electrode driving circuit 432 for driving the PDP 102. Since the PDP 102 has four display electrode pair groups, the scan electrode driving circuit 432 is provided with switch circuits 75*a*, 75*b*, 75*c*, and 75*d* and with scan pulse generator circuits 70*a*, 70*b*, 70*c*, and 70*d*.

The scan pulse generator circuit 70*a* is connected to the scan electrodes SC1 to SC1080 belonging to the first display electrode pair group. The scan pulse generator circuit 70*b* is connected to the scan electrodes SC1081 to SC2160 belonging to the second display electrode pair group. The scan pulse generator circuit 70*c* is connected to the scan electrodes SC2161 to SC3240 belonging to the third display electrode pair group. The scan pulse generator circuit 70*d* is connected to the scan electrodes SC3241 to SC4320 belonging to the fourth display electrode pair group. Operations are performed while shifting the sustain periods by display electrode pair group in the same way as described above with reference to FIG. 11. In other words, for each of the four display electrode pair groups, the scan electrodes belonging to the group are written to, and immediately after the writing period, a sustain period is provided to apply a sustain pulse.

Figure 20:
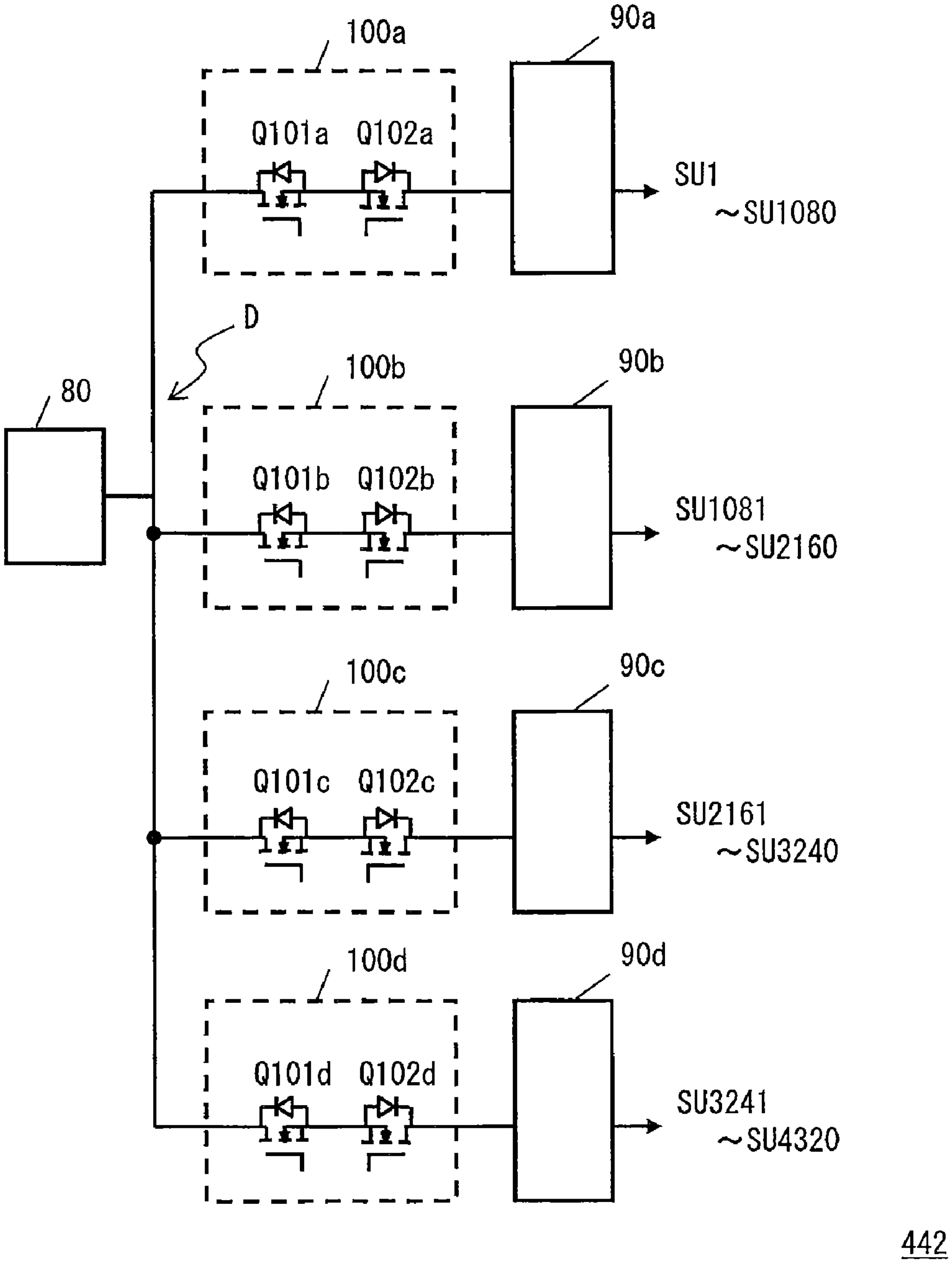
FIG. 20 is a circuit diagram of a sustain electrode driving circuit in the PDP device.

FIG. 20 is a circuit diagram of a sustain electrode driving circuit 442 for driving the panel shown in FIG. 18. Since the PDP 102 has four display electrode pair groups, the sustain electrode driving circuit 442 is provided with four switch circuits 100*a*, 100*b*, 100*c*, and 100*d* and with fixed voltage generator circuits 90*a*, 90*b*, 90*c*, and 90*d*.

The fixed voltage generator circuit 90*a* is connected to the sustain electrodes SU1 to SU1080 belonging to the first display electrode pair group and performs operations similar to those described above.

The fixed voltage generator circuit 90*b* is connected to the sustain electrodes SU1081 to SU2160 belonging to the second display electrode pair group. The fixed voltage generator circuit 90*c* is connected to the sustain electrodes SU2161 to SU3240 belonging to the third display electrode pair group. The fixed voltage generator circuit 90*d* is connected to the sustain electrodes SU3241 to SU4320 belonging to the fourth display electrode pair group. All of these circuits also perform operations similar to those described above.

Note that in general, when the number of display electrode pair groups is N, the display electrode pairs belonging to all of the display electrode pair groups can be driven by adding switch circuits 75*a* to 75*n* and scan pulse generator circuits 70*a* to 70*n* to the circuits shown in FIG. 19 and adding switch circuits 100*a* to 100*n* and fixed voltage generator circuits 90*a* to 90*n* to the circuits shown in FIG. 20.

Other Considerations

In Embodiment 2, the number of display electrode pairs in the PDP has been described as being set to 2160 or higher. The present invention may be adopted, however, to achieve similar advantageous effects in a PDP with fewer pairs, i.e. a PDP with SD, HD, or FHD resolution.

The specific numerical values used in the above embodiments are merely examples. It is preferable to set values appropriately in conjunction with factors such as panel characteristics, specifications of the plasma display device, and the like.

[Industrial Applicability]

The present invention achieves a high luminous efficiency particularly in ultra-high-definition PDPs and is therefore applicable to display devices for video display.

REFERENCE SIGNS LIST

1 front panel
2 back panel
3 rib
4 discharge electrode pair
5 dielectric layer
6 protective layer
7 data electrode
8 base dielectric layer
9 phosphor layer
11 discharge cell
10 PDP
21 front substrate
24 display electrode pair
25 dielectric layer
26 protective layer
31 back substrate
32 data electrode
33 dielectric layer
34 barrier rib
35 phosphor layer
100 PDP

The invention claimed is:

1. A plasma display panel having a pair of opposing substrates with a gap therebetween, the gap being partitioned by ribs into a plurality of discharge cells, a pair of discharge electrodes being provided on a surface of one of the pair of opposing substrates, the surface facing the gap, and a discharge gas being enclosed in each discharge cell, wherein a minimum width of a discharge space in each discharge cell is in a range from 65 μm to 100 μm at a position adjacent to the pair of discharge electrodes, primary components of the discharge gas are xenon, neon, and helium, and in the discharge gas, a partial pressure ratio of xenon is in a range from 15% to 25%, a partial pressure ratio of helium is in a range from 20% to 50%, and total pressure is in a range from 60 kPa to 70 kPa.

2. The plasma display panel of claim 1, wherein in the discharge gas, the partial pressure ratio of helium is in a range from 30% to 40%.

3. A display device including the plasma display panel of claim 1 and a driving circuit that drives the plasma display panel, wherein the plasma display panel comprises a plurality of pairs of discharge electrodes, and the driving circuit groups the plurality of pairs of discharge electrodes into a plurality of display electrode pair groups, divides, for each display electrode pair group, one field period into a plurality of subfields, each subfield including a writing period in which a writing discharge is generated in one of the discharge cells and a sustain period in which a sustain discharge is generated in the one of the discharge cells, and sets a time of the sustain period in each subfield of each display electrode pair group to be at most $Tw \times (N-1)/N$, where N is a number of display electrode pair groups, N being an integer greater than or equal to 2, and Tw is a time necessary for performing one writing operation in all of the discharge cells in the plasma display panel.

* * * * *